United States Patent
Yamagiwa

(10) Patent No.: US 7,764,173 B2
(45) Date of Patent: *Jul. 27, 2010

(54) IC TAG EQUIPPED VEHICLE AND MANAGEMENT SYSTEM THEREOF

(75) Inventor: Toshio Yamagiwa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 791 days.

This patent is subject to a terminal disclaimer.

(21) Appl. No.: 10/533,471

(22) PCT Filed: Feb. 13, 2004

(86) PCT No.: PCT/JP2004/001565

§ 371 (c)(1),
(2), (4) Date: Apr. 29, 2005

(87) PCT Pub. No.: WO2004/071856

PCT Pub. Date: Aug. 26, 2004

(65) Prior Publication Data

US 2006/0007003 A1    Jan. 12, 2006

(30) Foreign Application Priority Data

Feb. 14, 2003  (JP) .............................. 2003-036483

(51) Int. Cl.
  *G08G 1/017*  (2006.01)
  *G06Q 90/00*  (2006.01)
  *B62H 5/00*   (2006.01)
  *G07B 15/00*  (2006.01)
(52) U.S. Cl. ................. 340/572.1; 340/572.8; 340/427; 340/928; 701/32; 701/35; 235/384; 705/305; 705/308

(58) Field of Classification Search ............... 340/572.1, 340/572.8, 928, 988; 701/32, 35; 235/380, 235/384, 375, 385, 492
See application file for complete search history.

(56) References Cited

U.S. PATENT DOCUMENTS

| | | | |
|---|---|---|---|
| 4,555,414 A | | 11/1985 | Hoover et al. |
| 4,794,470 A | * | 12/1988 | Lauffenburger et al. ........ 360/69 |
| 5,459,304 A | * | 10/1995 | Eisenmann .................. 235/380 |
| 5,521,815 A | | 5/1996 | Rose, Jr. |
| 5,801,614 A | | 9/1998 | Kokubu |
| 5,838,233 A | * | 11/1998 | Hawes et al. .............. 340/572.5 |

(Continued)

FOREIGN PATENT DOCUMENTS

CN   1320890 A   11/2001

(Continued)

*Primary Examiner*—Davetta W Goins
*Assistant Examiner*—Anne V Lai
(74) *Attorney, Agent, or Firm*—Carrier, Blackman & Associates P.C.; William D. Blackman; Joseph P. Carrier

(57) ABSTRACT

A speedometer, a fuel gauge, an odometer, left and right turn indicators, and an ignition indicator are arranged in a meter panel of a meter unit. An IC tag into which an ID code in standardized data form is registered is installed on the back surface of the meter panel. The IC tag is resin molded and is installed on the back surface of the meter panel made of resin. The mold resin and the meter panel are both made of a resin material having transmissivity to electromagnetic waves. Information is wirelessly transferred to and from the IC tag, and may be managed using a data management system.

12 Claims, 17 Drawing Sheets

U.S. PATENT DOCUMENTS

| | | | |
|---|---|---|---|
| 5,955,965 A * | 9/1999 | Calandruccio | 340/825.49 |
| 6,030,478 A * | 2/2000 | Koch et al. | 156/123 |
| 6,222,463 B1 * | 4/2001 | Rai | 340/928 |
| 6,321,983 B1 | 11/2001 | Katayanagi et al. | |
| 6,332,572 B1 * | 12/2001 | Yamamoto et al. | 235/382 |
| 6,349,881 B1 * | 2/2002 | Wilkey et al. | 235/492 |
| 6,352,045 B1 * | 3/2002 | Takashima | 114/55.5 |
| 6,371,380 B1 | 4/2002 | Tanimura | |
| 6,546,088 B2 * | 4/2003 | Campbell | 379/90.01 |
| 6,547,128 B1 * | 4/2003 | Shimura | 235/95 B |
| 6,690,293 B2 | 2/2004 | Amita | |
| 6,791,456 B2 * | 9/2004 | Nakayama et al. | 340/429 |
| 6,816,083 B2 * | 11/2004 | Brandt | 340/870.11 |
| 6,873,259 B2 * | 3/2005 | Teraura | 340/572.1 |
| 6,959,259 B2 * | 10/2005 | Vock et al. | 702/142 |
| 7,031,946 B1 * | 4/2006 | Tamai et al. | 705/67 |
| 7,088,249 B2 * | 8/2006 | Senba et al. | 340/572.8 |
| 7,099,728 B2 | 8/2006 | Urabe | |
| 7,152,779 B2 * | 12/2006 | Yamagiwa | 235/375 |
| 7,164,132 B2 * | 1/2007 | Didomenico et al. | 250/338.5 |
| 7,503,506 B2 * | 3/2009 | Harada et al. | 235/492 |
| 7,522,881 B2 * | 4/2009 | Yamagiwa | 455/41.2 |
| 2001/0007335 A1 | 7/2001 | Tuttle et al. | |
| 2002/0097282 A1 * | 7/2002 | Maltseff | 347/5 |
| 2002/0113491 A1 | 8/2002 | Eglit et al. | |
| 2002/0133942 A1 | 9/2002 | Kenison et al. | |
| 2002/0185532 A1 * | 12/2002 | Berquist et al. | 235/385 |
| 2002/0196126 A1 * | 12/2002 | Eisenberg et al. | 340/10.2 |
| 2003/0088442 A1 * | 5/2003 | Michael et al. | 705/3 |
| 2003/0163287 A1 * | 8/2003 | Vock et al. | 702/187 |
| 2006/0202862 A1 * | 9/2006 | Ratnakar | 340/933 |

FOREIGN PATENT DOCUMENTS

| | | |
|---|---|---|
| DE | 3313481 | 10/1984 |
| DE | 3817428 | 11/1989 |
| DE | 19607294 | 8/1997 |
| EP | 1 247 706 A2 | 10/2002 |
| FR | 2704670 | 4/1994 |
| JP | 03-202992 A | 9/1991 |
| JP | 05-221352 | 8/1993 |
| JP | 08-276459 | 10/1996 |
| JP | 09-153156 | 6/1997 |
| JP | 09-212091 A | 8/1997 |
| JP | 11-133860 | 5/1999 |
| JP | 11-192620 | 7/1999 |
| JP | 2000-048066 | 2/2000 |
| JP | 2001-132002 | 5/2001 |
| JP | 2001-241372 A | 9/2001 |
| JP | 2002-049900 A | 2/2002 |
| JP | 2002 169858 | 6/2002 |
| JP | 2002-319008 A | 10/2002 |
| JP | 2003-233652 | 8/2003 |
| NL | 9101758 | 5/1993 |
| TW | 471674 | 1/2002 |
| TW | 484734 | 4/2002 |
| WO | WO 94/25936 | 11/1994 |
| WO | WO 95/22467 | 8/1995 |

* cited by examiner

FIG. 12

VEHICLE INFORMATION DATABASE
OWNER DATA

| VEHICLE ID | OWNER | | | |
| --- | --- | --- | --- | --- |
| | NAME | BIRTHDAY | ADDRESS | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |

FIG. 14

VEHICLE INFORMATION DATABASE
VEHICLE HISTORY DATA

| VEHICLE ID | XXXXXXXX | |
|---|---|---|
| DATE | HISTORY OUTLINE | DETAILS |
| DAY/MONTH/YEAR | NEW VEHICLE PRODUCTION | ○○ FACTORY, ○○ GIKEN KOGYO |
| DAY/MONTH/YEAR | OWNER REGISTRATION | OWNER NAME : xxxx,<br>ADDRESS : xxxxxx |
| DAY/MONTH/YEAR | REFUELING | GAS STATION : xxxx,<br>THE AMOUNT OF REFUELING : xx LITRE<br>... |
| DAY/MONTH/YEAR | REFUELING | GAS STATION : xxxx,<br>THE AMOUNT OF REFUELING : xx LITRE<br>... |
| DAY/MONTH/YEAR | REFUELING | GAS STATION : xxxx,<br>THE AMOUNT OF REFUELING : xx LITRE<br>... |
| DAY/MONTH/YEAR | REPAIR | REPAIR FACTORY : xxx,<br>THE CONTENTS OF REPAIR: xxxxxx |
| DAY/MONTH/YEAR | REFUELING | GAS STATION : xxxx,<br>THE AMOUNT OF REFUELING: xx LITRE<br>... |
| DAY/MONTH/YEAR | OWNER CHANGE | OWNER NAME : xxxx,<br>ADDRESS : xxxxxx |
| ⋮ | ⋮ | ⋮ |
| DAY/MONTH/YEAR | REGISTRATION CANCEL | |
| DAY/MONTH/YEAR | WASTE MANAGEMENT TAG ISSUANCE | |
| DAY/MONTH/YEAR | | |
| DAY/MONTH/YEAR | | |
| DAY/MONTH/YEAR | | |
| DAY/MONTH/YEAR | | |

FIG. 15

VEHICLE INFORMATION DATABASE
WASTE MANAGEMENT TAG ISSUANCE DATA

| VEHICLE ID | |
|---|---|
| WASTE MANAGEMENT TAG ISSUED FLAG | |
| DISPOSAL CODE | |
| DISCARDING COMPANY INFORMATION | PUBLIC KEY OF DISCHARGE COMPANY |
| COLLECTION AND TRANSPORTATION COMPANY INFORMATION | PUBLIC KEY OF COLLECTION AND TRANSPORTATION COMPANY |
| INTERMEDIATE PROCESSING COMPANY INFORMATION | PUBLIC KEY OF INTERMEDIATE PROCESSING COMPANY |
| FINAL DISPOSAL COMPANY INFORMATION | PUBLIC KEY OF FINAL DISPOSAL COMPANY |

IC TAG EQUIPPED VEHICLE AND MANAGEMENT SYSTEM THEREOF

CROSS-REFERENCE TO RELATED APPLICATIONS

The present application is the US National phase of International Patent Application No. PCT/JP2004/001565, with a filed on 13 Feb. 2004, which claims priority from Japanese Patent Application No. 2003-036483 filed on Feb. 14, 2003.

TECHNICAL FIELD

The present invention relates to an IC tag equipped vehicle and a management system thereof. More specifically, the present invention relates to a vehicle equipped with an IC tag into which information on production, sale, inspection, repair, disposal or recycling of a vehicle is registered, and relates to a management system thereof.

BACKGROUND ART

Theft and illegal abandonment of vehicles are widespread problems in society. Identification numbers such as a body number and an engine number other than a license plate are recorded in a vehicle. When the license plate is removed, it is still possible to identify the owner from the identification numbers.

However, since the relation between the identification numbers of the vehicle and the user is not recorded in a database, matching the two with each other is very troublesome. Since the body number and the engine number are stamped on the body frame and the engine main unit, respectively, in many cases, they cannot be read due to dirt or corrosion. In such a case, the owner cannot be identified from the vehicle.

With a different managed target, a technique for providing product tags incorporating an IC chip on all products in order to manage products in stock or sales is disclosed in Japanese Unexamined Patent Application, First Publication No. Hei 11-133860. An identifier specific to each product is written into the product tag and is read by an exclusive tag reader to permit centralized product management.

On the other hand, when asking for disposal of industrial waste, a discarding company describes the kind, quantity, shape and assembled form of the industrial waste, the name of a collection or transportation company, the name of a disposal company, the place of final disposal, and the instructions of handling in an "industrial waste management tag (manifest)", takes and manages the flow of the industrial waste for itself, and checks the disposal of the waste. Introduction of such a manifest system is advancing.

A method for managing products using an RFID (Radio Frequency Identification) is gradually becoming accepted. This is a method for attaching an IC tag (also called a wireless tag or an electronic tag) as a small tag incorporating an IC (integrated circuit) and means transmitting and receiving a radio signal to a product or its container to read information for identifying the type of the product and the product individual from the IC tag in the distribution process of the product, and managing the places and the types of products in stock using a computer.

Japanese Unexamined Patent Application, First Publication No. 2002-169858 discloses a system technique in which an IC tag is kept in a fixed state from production to disposal of a product such as a vehicle, to read information specific to the product stored in the IC from a computer, thereby managing the product from production to disposal. The system includes any one of stock management, shipping management, distribution management, maintenance management, and customer management from production to disposal. The patent document discloses a technique (in FIGS. 2 and 3, and in the seventh paragraph) for fixing an IC tag to a chassis frame made of a steel plate and a technique (in FIG. 5, and in the twentieth paragraph) for fixing an IC tag to an electromagnetic shielding plate (in FIG. 2, and in the ninth paragraph) electromagnetically shielding an IC tag antenna from a chassis frame made of a steel plate, the side of the chassis frame, the bottom of a monocoque body or a bumper.

Japanese Unexamined Patent Application, First Publication No. Hei 5-221352 discloses a product management system for continuously managing a product with a tag fixed from its production to disposal without losing the tag. The system can write once information specific to the product into an IC chip to manage the processes of from production to disposal of the product using a computer.

A technique for detecting theft of a product using a theft detection device for product management exists. For example, in Published Japanese Translation No. 2001-511270 of the PCT International Application, a wireless transmission unit for theft detection is provided on a plastic fastener fixing a tag to a product to detect electromagnetic waves outputted at the time of theft by a sensor, thereby detecting the theft.

To solve the above-described problems, identification numbers may be desirably written into all vehicles so as to be easily and reliably read at all times. To spread such a manifest system, it is desirable to register the contents recorded to the manifest as electronic data into a vehicle and to read them easily.

To prevent illegal disposal of engine oil and consumable parts other than the recorded items to the manifest, it is desirable to register a replacement record of the consumable parts and a maintenance record as electronic data into a vehicle and to read them easily. However, these pieces of information have been all recorded into a record sheet so that effective use thereof has been difficult.

By application of a product tag of the prior art to vehicle management, when the product tag is provided on each vehicle and various records or information can be registered thereinto, its management becomes easy. When the product tag is provided on a product displayed in a store such as a supermarket, it is removed after the product is bought. Being provided on a motorcycle, the product tag is taken out outside. It must withstand use under more severe conditions.

The tag provided on a vehicle is accessed by plural companies such as a dealer, a repair company, a maintenance company and a disposal company and can be subject to falsification or an act of destruction by a malicious third party. In the prior art product tag, taking it outside is not considered and forming the product tag with resistance to falsification or an act of destruction is not sufficient to avoid adverse environmental effects. This prior art product tag thus cannot be applied directly to vehicle management.

Data of a tag equipped in a vehicle are frequently read or written. When the reading distance between the tag and a reader is long, a radio output of the tag and the reader must be increased. The tag cannot be smaller and an output of the reader cannot be lowered.

When an IC tag is fixed to a chassis frame of a vehicle using the above prior art, the overall chassis frame is covered by the metal body of the vehicle. A read/write signal (an electromagnetic wave) from/into the IC tag is shielded by the body. In order to read and write information of the IC tag, an IC tag read/write device must be brought under the body so as to be near to the chassis, which is very inconvenient.

The durability of the IC tag is poor under severe conditions under the body. The load of the management cost is large.

The above sensor outputs an electromagnetic wave having a resonance frequency to the tag, and a transponder provided in the tag receives and resonates the electromagnetic wave to notify theft detection to the sensor. The electromagnetic wave transmitted and received here is not affected by the existence of plastic. No reading failure can occur under the assumption conditions of the above invention.

A metal part reflects electromagnetic waves. When a product is constructed of a metal part, reading failure of product information stored in a tag occurs on the sensor side and the tag information cannot be read as expected.

To solve the problems described above, a first object of the present invention is to provide a vehicle equipped with an IC tag which can withstand use in a severe environment such as outdoors and is excellent in resistance to falsification or an act of destruction, and to provide a management system thereof.

A second object of the present invention is to provide a vehicle which can improve the durability or reliability of an IC tag installed on a body.

SUMMARY OF THE INVENTION

The present invention provides a vehicle equipped with an IC tag into which an ID code in standardized data form is registered.

(1) The vehicle includes: an element formed of a material having transmissivity to electromagnetic waves; and an IC tag housed in the element and storing at least a vehicle ID.

(2) The element may be a case of a meter unit, and the IC tag may be housed in the meter unit.

(3) The vehicle may further include a meter panel formed of a material having transmissivity to electromagnetic waves, and the IC tag may be installed on the back surface of the meter panel.

(4) The IC tag may be molded resin.

Furthermore, the present invention provides a management system of an IC tag equipped vehicle.

(5) The management system includes: a host server and a terminal communicating with each other via a network; and a database connected to the host server and managing tag information on each vehicle by a vehicle ID to store it. The terminal may include: a device for reading a vehicle ID from an IC tag equipped in a vehicle; a device for transmitting the vehicle ID to the host server; and a device for receiving tag information transmitted from the host server in response to the vehicle ID. The host server may include: a device for searching the database by a vehicle ID received from the terminal as a search key to extract tag information corresponding to the vehicle ID; and a device for transmitting the extracted tag information to the terminal.

The present invention provides a saddle-ride type vehicle equipped with an IC tag into which an ID code in standardized data form is registered.

(6) The IC tag may be installed near a steering handle of the saddle-ride type vehicle.

(7) The IC tag may be installed near a number plate of the rear side of the body of the saddle-ride type vehicle.

BRIEF DESCRIPTION OF THE DRAWINGS

FIG. 12 is a data structure diagram for owner data for the vehicle management system of the fourth embodiment.

FIG. 14 is a data structure diagram for vehicle history data for the vehicle management system of the fourth embodiment.

FIG. 15 is a data structure diagram for waste management tag issuance data for the vehicle management system of the fourth embodiment.

BEST MODE FOR CARRYING OUT THE INVENTION

Preferred embodiments of the present invention will be explained below with reference to the appended drawings. The present invention is not limited to the embodiments described below, and, for example, the constituting elements of the embodiments may be preferably combined with each other.

First Embodiment

A first embodiment of the present invention will be explained below with reference to the appended drawings.

Figure 1:
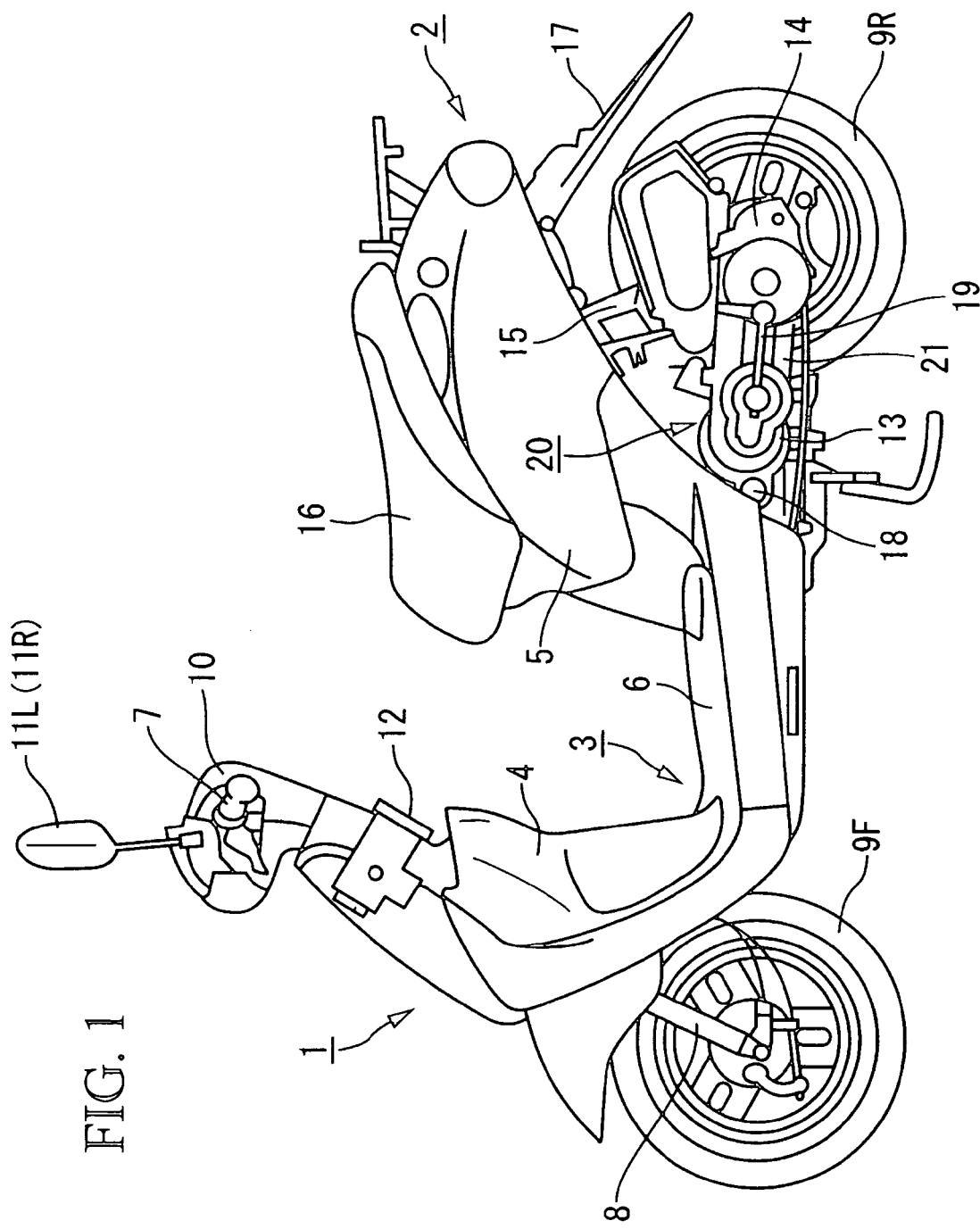
FIG. 1 is a side view of an IC tag-equipped vehicle according to a first embodiment of the present invention.

FIG. 1 is a side view of a scooter type motorcycle to which the present invention is applied. A body front part 1 is coupled to a body rear part 2 via a low floor part 3. The frame of the parts is generally formed by a body frame having a lower tube and a main pipe.

The body front part 1, the body rear part 2 and the floor part 3 are covered by a front cover 4, a body cover 5 and a center cover 6, respectively. The body front part 1 is provided in its upper part with a steering handle 7 axially supported by a steering head. A front fork 8 extends downward and at its lower end, a front wheel 9F is axially supported.

A swing unit 20 is swingably coupled and supported via a link member 18 at the lower end of the ascending part of the main pipe 7. The swing unit 20 is provided in its front part with a four-single-cylinder four-cycle engine 13. The crankshaft of the engine 13 is coupled to a kick pedal 19 for starting the engine when the battery voltage is low. A belt type continuously variable transmission 21 extends from the engine 13 to the rear side. A rear wheel 9R is axially supported on a reduction gear mechanism 14 provided in the rear part of the continuously variable transmission 21 via a centrifugal clutch. A rear shock absorber 15 is interposed between the upper end of the reduction gear mechanism 14 and the main pipe.

The upper part of the steering handle 7 is covered by a steering handle cover 10 serving as an instrument panel. The steering head, the front fork 8 and the steering handle 7 form a steering means. The grip part of the steering handle 7 protrudes from the steering handle cover 10 to the left and right of the body. A side mirror 11L (11R) protrudes upward. A steering handle lock module 12 locks the steering handle 7 to disable steering.

A seat 16 is provided in the upper side a body cover 5 so as to cover a containing box. The seat 16 can be opened and closed, and the containing box in the lower part thereof can contain a helmet. The body cover 5 is provided in its rear part with a license plate installation part 17, a loading space and a tail lamp. Accompanied by the engine, an intake pipe, a carburetor and an air cleaner are disposed therein, and the illustration thereof is omitted.

Figure 2:
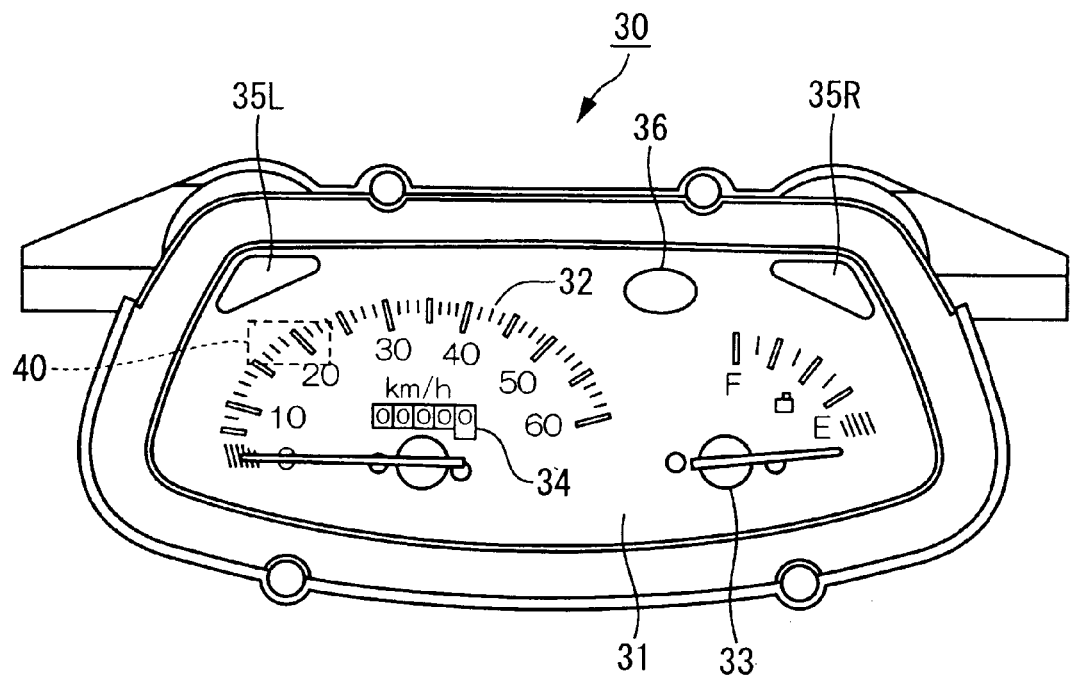
FIG. 2 is a front view of a meter unit.
Figure 3:
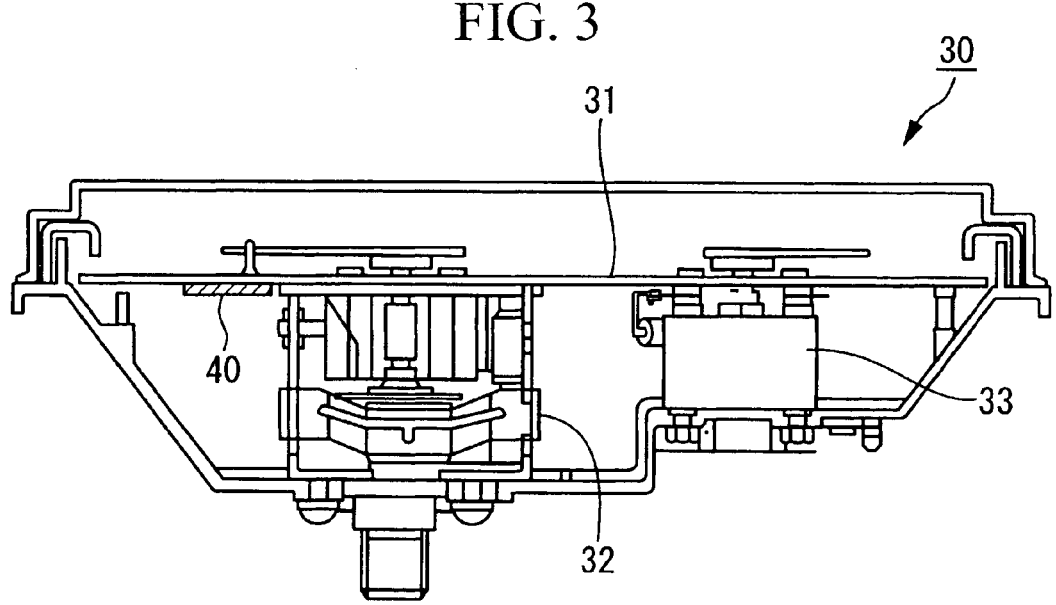
FIG. 3 is a cross-sectional view showing the construction of the meter unit.

FIG. 2 is a front view of a meter unit 30 incorporated into the steering handle cover 10. FIG. 3 is a diagram showing its cross-sectional construction.

The body case of the meter unit 30 and a meter panel 31 are both made of a resin material having transmissivity to electromagnetic waves. A speedometer 32, a fuel gauge 33, an odometer 34, left and right turn indicators 35L and 35R, and an ignition indicator 36 are arranged in the meter panel 31. An IC tag 40 into which an ID code in standardized data form is registered, as shown in FIG. 3, is installed on the back surface of the meter panel 31.

Figure 4:
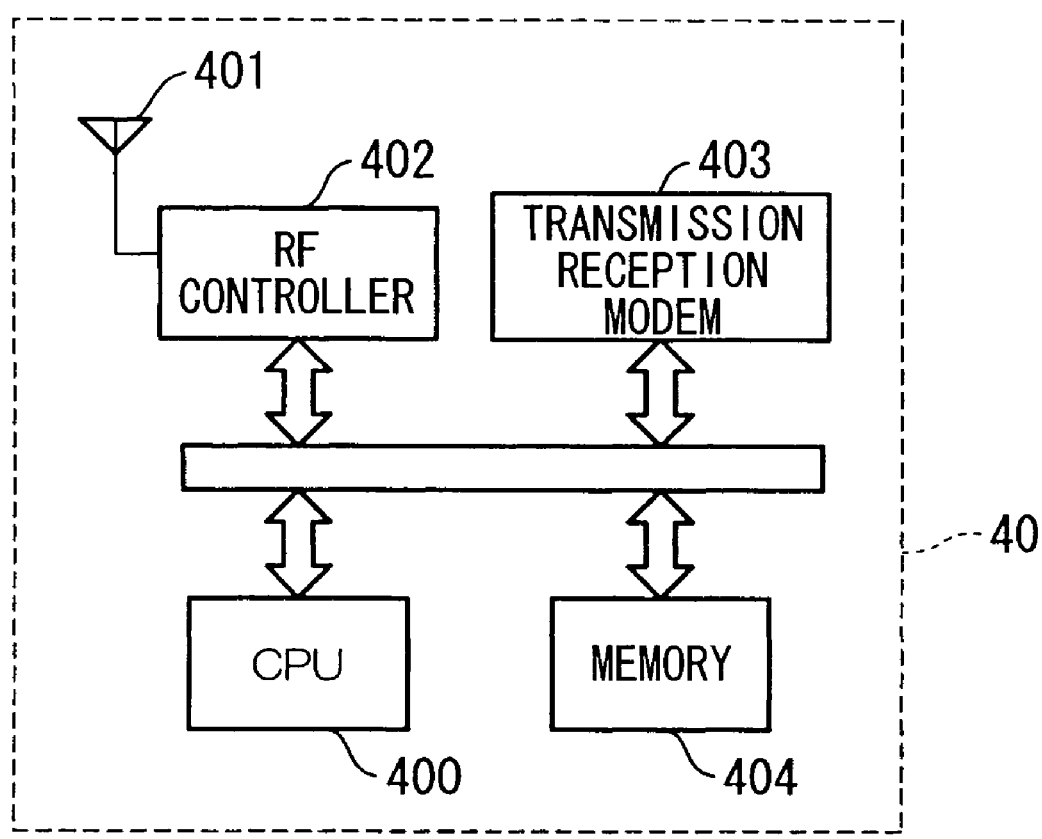
FIG. 4 is a block diagram showing the configuration of the main part of an IC tag.

FIG. 4 is a block diagram showing the configuration of the main part of the IC tag 40 and includes an RF antenna 401, which transmits and receives an electromagnetic wave in an RF band. The IC tag 40 includes an RF controller 402 controlling the RF antenna, and a transmission/reception modem 403 for modulating information stored in a memory 404, transmitting it from the RF antenna 401, and detecting an electromagnetic wave received by the RF antenna 401. The IC tag 40 further includes a CPU 400 controlling the other components of the tag. In this embodiment, the IC tag 40 is molded in resin, and the resin is installed on the back surface of the meter panel 31. In this embodiment, the molded resin also has transmissivity to electromagnetic waves. The molded resin, the meter panel 31, and the case of the meter unit 30 will not block the electromagnetic waves transmitted to and received from the IC tag 40.

At least a vehicle ID specifying the vehicle is registered into the IC tag 40. Recycling information as reference for recycling the vehicle; and as information which must be described in the manifest system, the kind, quantity, shape and assembled form of industrial waste, the name of a collection or transportation company, the name of a disposal company, the place of final disposal, and the instructions of handling, can be also registered thereinto.

Furthermore, identification information indicating the material of each component part of the vehicle can be registered into the IC tag 40. Other information that can be registered includes, but is not limited to, identification information specifying the replacement date of a consumable part such as a headlight, tire or engine oil and a replacement company; the contents of maintenance of the vehicle; the name of a maintenance company; a maintenance record and a repair record such as a mileage at maintenance; as an insurance contract record of the vehicle, the type of an insurance, the name of a contractor, the contents of a contract and an insurance period; a tax payment record of the vehicle; information recorded into a motor vehicle inspection certificate of the vehicle; and information on the owner of the vehicle. These pieces of information can be read and written by wireless communication using an exclusive terminal.

According to this embodiment, the IC tag 40 is housed in the meter unit having a high sealing ability. Being installed on a vehicle used outside, it cannot be affected by wind and rain. Since the IC tag 40 is installed on the back surface of the meter panel 31, it is difficult to be affected by ultraviolet light. The meter panel 31 is formed of a resin material having transmissivity to electromagnetic waves, which can exhibit the above effect without lowering the sensitivity of wireless communication.

According to this embodiment, because a vehicle ID can be registered into the IC tag 40, the owner is easily specified when the vehicle is illegally abandoned. Even when a vehicle is stolen, checking is easy. Stolen vehicles are easily found, preventing illegal export of the stolen vehicle.

According to this embodiment, because a maintenance record or a repair record can be registered into the IC tag 40, the maintenance history or the repair history can be easily checked. When a mileage is registered at maintenance or repair, the presence or absence of meter reset due to rolling back the odometer can be checked. According to this embodiment, an insurance contract record, a tax payment record, or the contents of a motor vehicle inspection certificate can be registered into the IC tag 40. These can also be easily checked.

In the description of the above embodiment, the IC tag 40 is resin molded to be installed on the back surface of the meter panel 31. It may be embedded in the resin of the resin case by a suitable technique such as insert forming.

In the description of the above embodiment, various pieces of information including a vehicle ID are all registered into the IC tag 40. The present invention is not limited thereto. As in the second embodiment shown in FIG. 5, only a vehicle ID may be registered into the IC tag 40; other information (hereinafter, expressed as tag information) may be managed by a host server 51 provided on a network 50, and may be suitably read from a database (DB) 52 of the server 51 using the vehicle ID as a search key.

Second Embodiment

A second embodiment of the present invention will be explained below with reference to the appended drawings.

Figure 5:
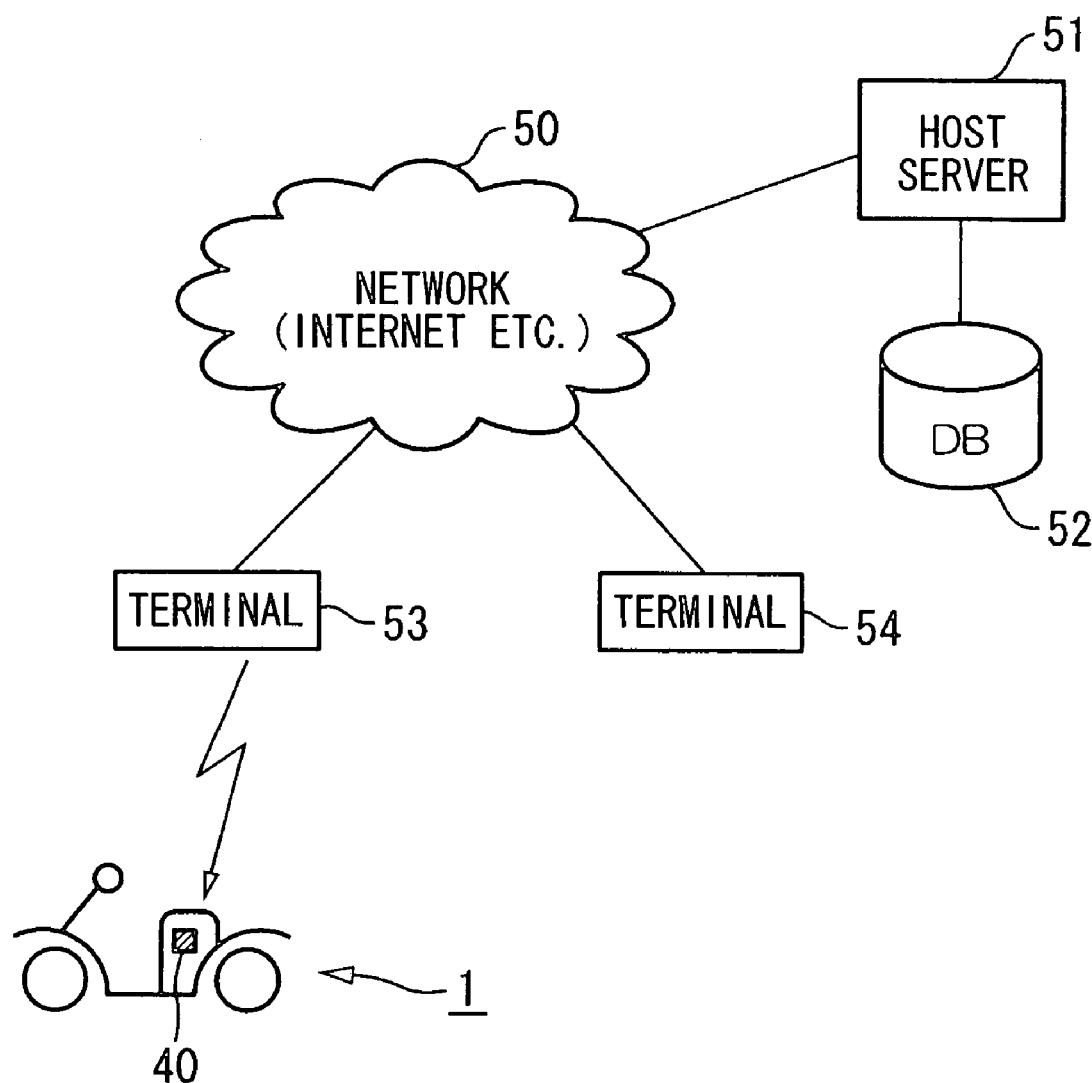
FIG. 5 is a block diagram of a second embodiment of the present invention showing the configuration of a management system of an IC tag equipped vehicle.

In FIG. 5, a network 50 is a wide-area network, typically, the Internet, and is connected to a host server 51. The host server 51 is connected to a database 52. With regard to a large number of vehicles, recycling information thereof, information which must be described in the manifest system, a maintenance record, a repair record, an insurance contract record, a tax payment record, and owner information of the vehicles, which are information registered into an IC tag 40 of each vehicle in the first embodiment, are managed as tag information by a vehicle ID and are stored in the database 52.

The network 50 is connected to plural IC tag transmission/reception terminals 53, 54, etc., (only two terminals are shown in FIG. 5). Terminals are provided to each vehicle, manufacturer, vehicle dealer, repair and maintenance company, recycle company and waste disposal company. The terminals 53, 54, etc., can access the host server 51 and the database 52 via the network 50. The terminals 53, 54, etc., perform wireless communication with the IC tag 40 equipped in a vehicle 1 and can call a vehicle ID registered into the IC tag 40.

Figure 6:
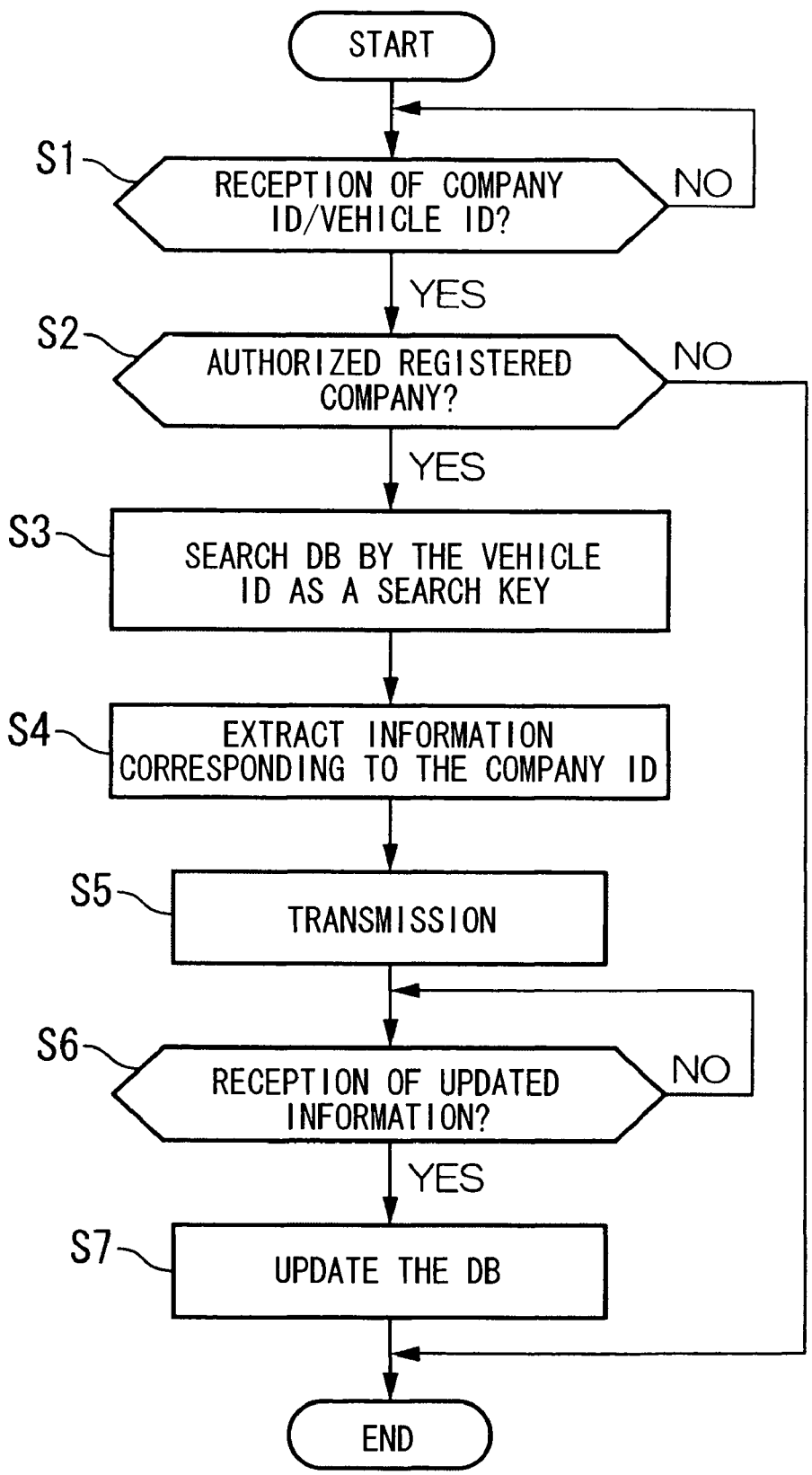
FIG. 6 is a flowchart showing the operation of the management system of an IC tag-equipped vehicle of the second embodiment.

FIG. 6 is a flowchart showing the operation of the above embodiment. Focusing on the operation of the host server 51, the operation of a management system of a vehicle equipped with an IC tag according to this embodiment will be described.

For example, when a repair and maintenance company is required to maintain the vehicle 1, a vehicle ID registered into the IC tag 40 of the vehicle 1 is read on the terminal 53. The vehicle ID is transmitted onto the network 50 together with a company ID specific to each company.

The host server 51 receives the vehicle ID and the company ID in step S1. In step S2, whether the company ID is that of an authorized registered company allowed to access the server 51 is decided. When the company ID has been registered, the routine is advanced to step S3 to search the database 52 by the vehicle ID as a search key.

In step S4, of many pieces of tag information registered about the vehicle ID, only tag information allowed to be accessed to a company specified by the company ID is extracted to be transmitted to the terminal 53 in step S5. The repair and maintenance company, which has been required to maintain the vehicle, displays the extracted tag information on the screen of the terminal 53. The company can then to refer to it, and update part or all of the tag information according to the contents of maintenance executed to the vehicle 1. When the updated contents are received in step S6, in step S7, the host server 51 replaces the tag information registered into the database 52 with the updated tag information so as to update the database 52.

According to this embodiment, only a vehicle ID is registered into the IC tag 40 equipped in the vehicle 1 and other tag information is centralization managed by the database 52 of the host server 51. The storage capacity of the IC tag 40 can be small.

Third Embodiment

A third embodiment of the present invention will be explained below with reference to the appended drawings.

Figure 7:
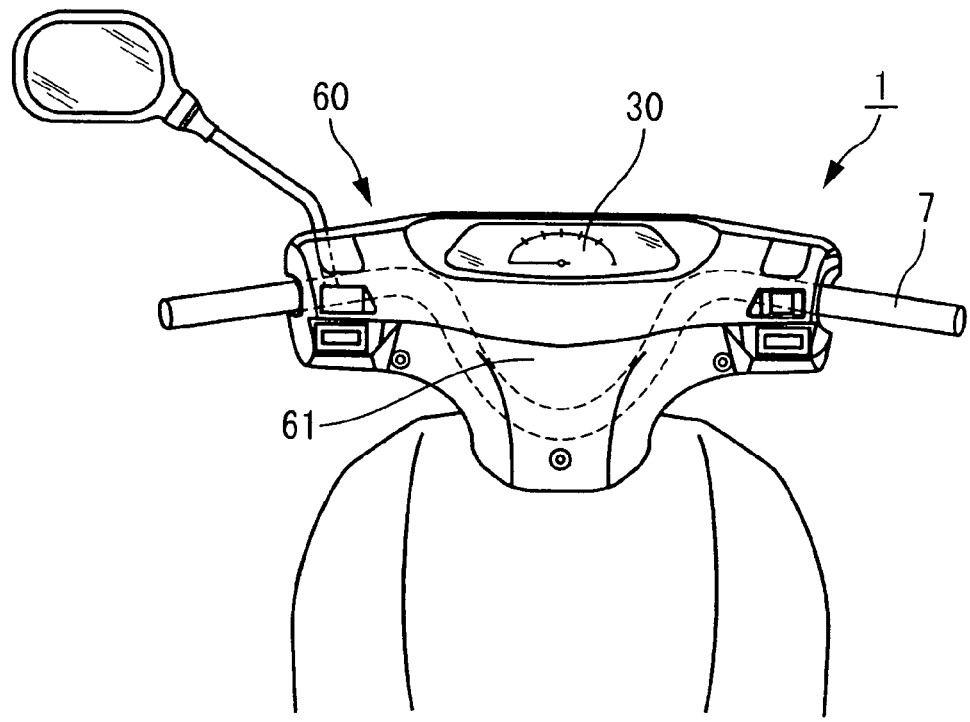
FIG. 7 is a perspective view of a front handle portion of an IC tag equipped vehicle of the third embodiment as viewed from the driver's seat.

FIG. 7 is a front view around a front steering handle of a scooter type (saddle-ride type) motorcycle applying the present invention viewed from the driver's seat.

In the drawings, a steering handle 7 of a body front part 1 is fixed to the top of a steering handle rotation axis, the steering handle rotation axis is axially supported on a head pipe part of a body frame rotatably so as not to be moved in the axial direction, and its lower end is coupled to a pair of left and right front forks 8 to steer a front wheel 9F.

Most of the peripheral part of the steering handle 7 except for a meter unit 30 and a grip part is covered by a steering handle cover. The steering handle cover has a front steering handle cover 60 and a rear steering handle cover 61.

In the steering handle cover, the rear steering handle cover 61 is screwed into installation means (not shown) fixed to the steering handle 7 with bolts and the front steering handle cover 60 is screwed into the rear steering handle cover 61 with bolts. Alternatively, the overall steering handle cover is fixed and supported on the steering handle 7 by fixation in the fitting relation between the convex part and the concave part.

Figure 8:
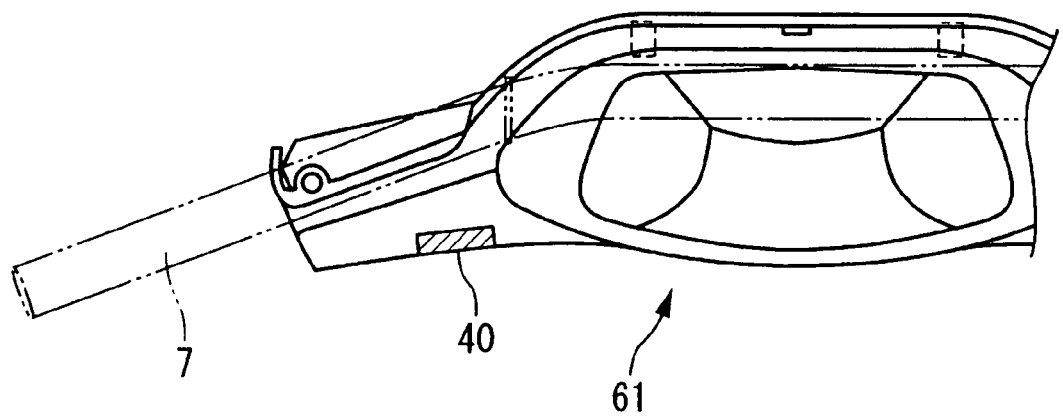
FIG. 8 is a partial plan view of the front handle portion of an IC tag-equipped vehicle of the third embodiment.

As shown in FIG. 8, an IC tag 40, into which an ID code in standardized data form is registered, is installed in the front steering handle cover 60 and the rear steering handle cover 61. Alternatively, the IC tag 40 is installed on the back side of the front steering handle cover 60 and the rear steering handle cover 61. In another alternative placement, the IC tag 40 may be installed on a fender as a front part of the vehicle. The IC tag 40 may be also installed on a rear part of the vehicle. Specifically, the IC tag 40 is installed on a license plate installation part (number plate installation stay) 17, the rear part of a seat 16, a loading space, or a tail lamp, shown in FIG. 1. For the seat 16, as in resin covers, the IC tag 40 may be installed in the seat 16 or may be installed on the back side of the seat 16.

In the above description, the IC tag installation position of a motorcycle (similarly, a motorbike) is shown. Other than the motorcycle, in a saddle-ride type vehicle such as a bicycle, a personal water craft (PWC) and a four-wheel buggy, the IC tag 40 can be installed on the part around the front steering handle 7 and the part around the rear number plate installation part 17.

Conventionally, a plurality of such saddle-ride type vehicles are placed parallel to each other for transportation and storage. As a result of the arrangement of the IC tag 40 disclosed in this embodiment, a portable IC tag reader is directed from the front or rear side, not from the side of the vehicle. As a result, a transmitted/received electromagnetic wave outputted from the IC tag installed near the front steering handle or near the number plate of the rear side of the body of the saddle-ride type vehicle reaches the reader without being shielded. In addition, the reading distance is shorter and the electromagnetic wave state is better than the case of installing the IC tag 40 around a floor part 3, a body cover 5 and a center cover 6 at the center of the vehicle. Other advantages are as follows: Data reading is simplified. An electromagnetic wave output of the IC tag 40 and the reader can be reduced. The cost can be reduced by the smaller IC tag and an electromagnetic wave output of the reader.

An electromagnetic wave transmits through around the steering handle, around the meter, and around the fender, the license plate installation part 17, the rear part of the seat 16, the loading space, the tail lamp, the steering handle cover 60, the rear steering handle cover 61, and the inside and back side of the seat 16. Installation of the IC tag on a front part of the vehicle is convenient for reading and writing storage information of the IC tag using an electromagnetic wave signal. The IC tag is fixed to the vehicle from production to disposal of the vehicle. The IC tag is installed on the front steering handle cover 60, the rear steering handle cover 61 or in the seat 16. The IC tag cannot be easily removed.

Fourth Embodiment

Figure 9:
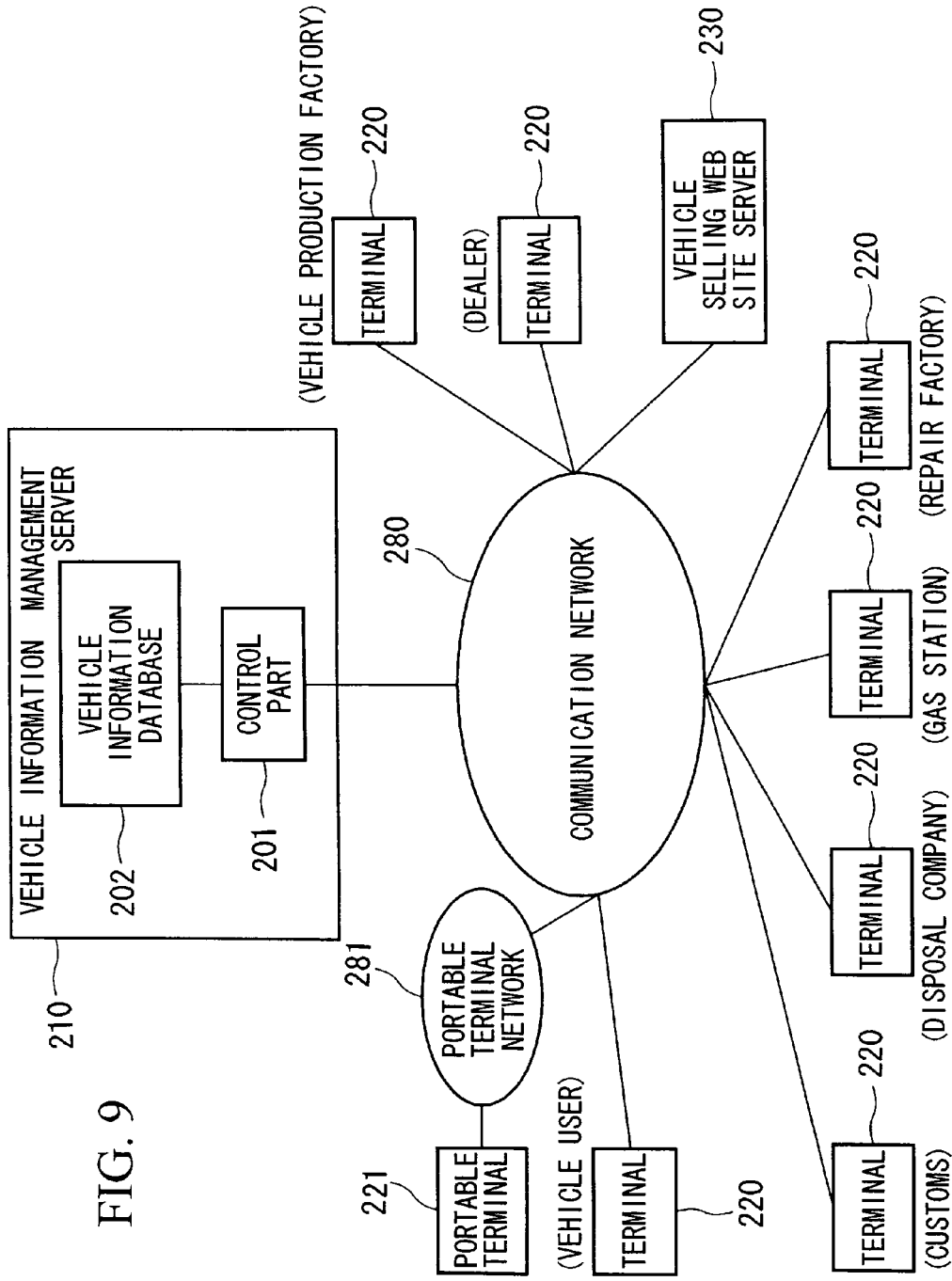
FIG. 9 is a configuration diagram of a vehicle management system as a fourth embodiment of the present invention.

FIG. 9 is a block diagram showing the configuration of a vehicle management system according to this embodiment. In FIG. 9, the reference numeral 210 denotes a vehicle information management server. The vehicle information management server 210 includes a control part 201 and a vehicle information database 202. Control part 201 includes (identification means, information output means, search target identification information storage means, comparison means, owner information extraction means, waste management tag issuance means, and disposal product information output means. The vehicle information database 202 includes product information storage means, component parts information storage means, owner information storage means, and waste disposal information storage means. The reference numeral 220 denotes terminals, each provided for a vehicle production factory, a vehicle dealer, a vehicle repair factory, a gas station, a vehicle disposal company, customs, and a vehicle user. The terminals 220 are connected to an IC tag read/write device (tag information reading means) as necessary and can read and write information of a memory in an IC tag provided on a vehicle or an IC tag embedded in a vehicle registration certificate. The disposal company includes a discarding company discarding a waste, a collection and transportation company collecting and transporting the discharged waste, an intermediate processing company performing intermediate processing of the waste, and a final disposal company performing final disposal after the intermediate processing. The reference numeral 221 denotes a portable terminal held by the vehicle user. The reference numeral 230 denotes a vehicle selling web site server provided for selling a vehicle using the so-called web interface via a communication network.

The reference numeral 280 denotes a communication network. The vehicle information management server 210, the terminals 220, the portable terminal 221 and the vehicle selling web site server 230 can communicate with each other via the communication network 280. The portable terminal 221 can be connected to the communication network 280 via a portable phone network 281. The portable phone network 281 is connected to the communication network 280 via a gateway device (not shown).

In the vehicle information management server 210, the vehicle information database 202 holds management information throughout the life cycle of factory's shipping to disposal of each vehicle. As will be described below, the control part 201 transmits and receives data to/from the terminals 220, the portable terminal 221, and the vehicle selling web site server 230, refers to data stored in the vehicle information database 202, and writes data into the vehicle information database 202.

The vehicle information management server 210, the terminals 220, and the vehicle selling web site server 230 are realized using a computer. As the portable terminal 221, a portable type phone terminal (portable phone terminal or PHS (trademark, Personal Handy Phone system) terminal) and PDA (personal digital assistant) are used. Each of these devices contains a CPU (central processing unit). The process of processing performed by each of these devices is stored in a computer-readable recording medium in a computer program form. The program is read and executed by the CPU to perform the processing. The computer-readable recording medium refers to a magnetic disc, an optical magnetic disc, a CD-ROM, a DVD-ROM and a semiconductor memory. The computer program may be delivered via a communication line to a computer and the CPU provided on the computer which has received the delivery may execute the program.

In this system, means for identifying each vehicle will be described. An IC tag identifiable by a vehicle ID is provided on a vehicle. An IC tag 72 incorporates a semiconductor memory. Both a rewrite-protect area and a rewritable area exist in the semiconductor memory. At least a vehicle ID for identifying a vehicle is written into the rewrite-protect area.

The IC tag 72 can be provided, for example, in the seat in a vehicle (motorcycle, four-wheel vehicle, bicycle, personal water craft (PWC) and four-wheel buggy). Because the seat is made of a resin member which allows the passing of the electromagnetic waves therethrough, installation of the IC tag in the seat is convenient for reading and writing storage information of the IC tag using an electromagnetic wave signal. Because a saddle-ride type vehicle has no metal roof covering the upper part of the seat, an IC tag read/write device can be provided, for example, above the vehicle stop position at a gas station, in a repair factory or on a road, which is convenient. The IC tag is fixed to the vehicle from production to disposal thereof. The IC tag is provided in the seat to be prevented from being easily removed.

In the case of a vehicle having a metal roof such as an automobile, bus or truck, an IC tag is installed in the seat, and a portable read/write device is brought into the vehicle to read and write IC tag information. Alternatively, an IC tag is installed near the front or rear window of a vehicle. For example, an IC tag may be installed in a dashboard part to permit reading from and writing to the IC tag from above the vehicle. An IC tag may be installed in a resin member constructing the dashboard part.

Figure 10:
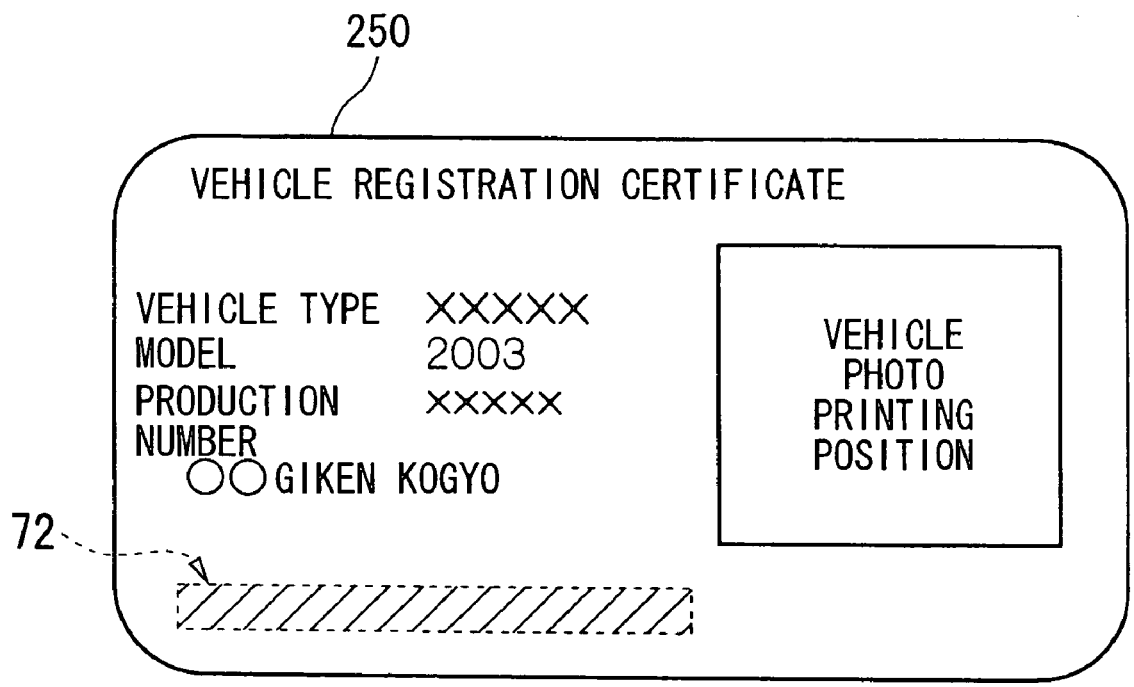
FIG. 10 is a schematic view of a vehicle registration certificate.

A vehicle registration certificate used in this system will be described. FIG. 10 is a schematic diagram showing an example of the surface of a vehicle registration certificate. In the drawing, a vehicle registration certificate 250 is a certificate issued for each vehicle. As shown in the drawing, the type, the year model (indicated as "model 2003"), the production number and the name of a production company of a target vehicle are described on its surface and the photo of the vehicle is printed or adhered thereon. The reference numeral 72 denotes an IC tag embedded in the vehicle registration certificate 250. The IC tag 27 incorporates a semiconductor memory. Both a rewrite-protect area and a rewritable area exist in the semiconductor memory.

The vehicle registration certificate is issued by a manufacturer manufacturing a vehicle or a public organization managing vehicle registration. The vehicle registration certificate has a size of 5.3 cm×8.5 cm and is of about a credit card size. The material thereof is plastic or the like.

Figure 11:
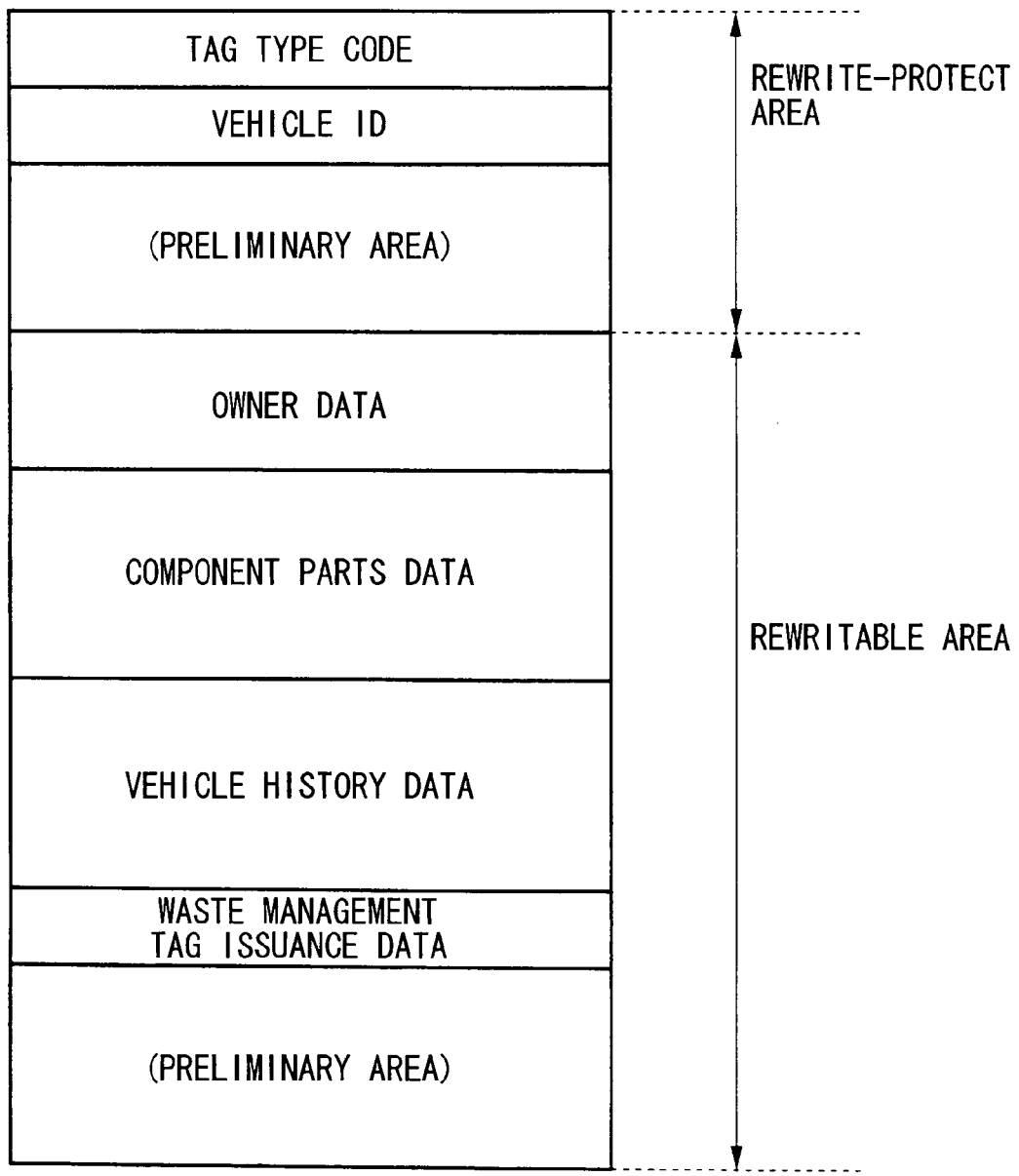
FIG. 11 is a structure diagram of data stored in a memory in an IC tag.

Information held by an IC tag provided on a vehicle and the IC tag 72 embedded in the vehicle registration certificate 250 will be described. FIG. 11 is a schematic diagram showing the structure of data stored in the memory of these tags. As shown in the drawing, both a rewrite-protect area and a rewritable area exist in the memory. The rewrite-protect area protects against rewriting using a ROM (read only memory). Alternatively, the control function of the IC tag controls protection against rewriting into the rewrite-protect area.

The rewrite-protect area stores a tag type code and a vehicle ID and is provided with a preliminary area. The tag type code is code information for deciding whether the IC tag is an IC tag provided on a vehicle or an IC tag provided in a vehicle registration certificate. The vehicle ID is code information for identifying each vehicle.

The rewritable area stores owner data, component parts data, vehicle history data, and waste management tag issuance data and is provided with a preliminary area. As will be described below, the same owner data, component parts data, vehicle history data, and waste management tag issuance data are held and managed in the vehicle information database 202. In this system, the vehicle management server 210 can communicate with the terminals 220 via the communication network 280. Data (owner data, component parts data, vehicle history data, and waste management tag issuance data) stored in the vehicle information database 202 and data (owner data, component parts data, vehicle history data, and waste management tag issuance data) stored in the IC tag are suitably updated in synchronization with each other as necessary. The storage capacity of the IC tag is limited. The vehicle information database 202 may be provided with a full set of each data and the IC tag may be provided only with a sub set of each data.

Referring to FIGS. 12 to 15, each data held by the vehicle information database 202 will be described. Part or all of the data shown in FIGS. 12 to 15 are held on the IC tag side for each vehicle.

FIG. 12 is a schematic diagram showing a data structure of owner data included in the vehicle information database 202. As shown in the drawing, the owner data includes owner information corresponding to a vehicle ID. The owner information is information on the name, birthday and address of an owner.

Figure 13:
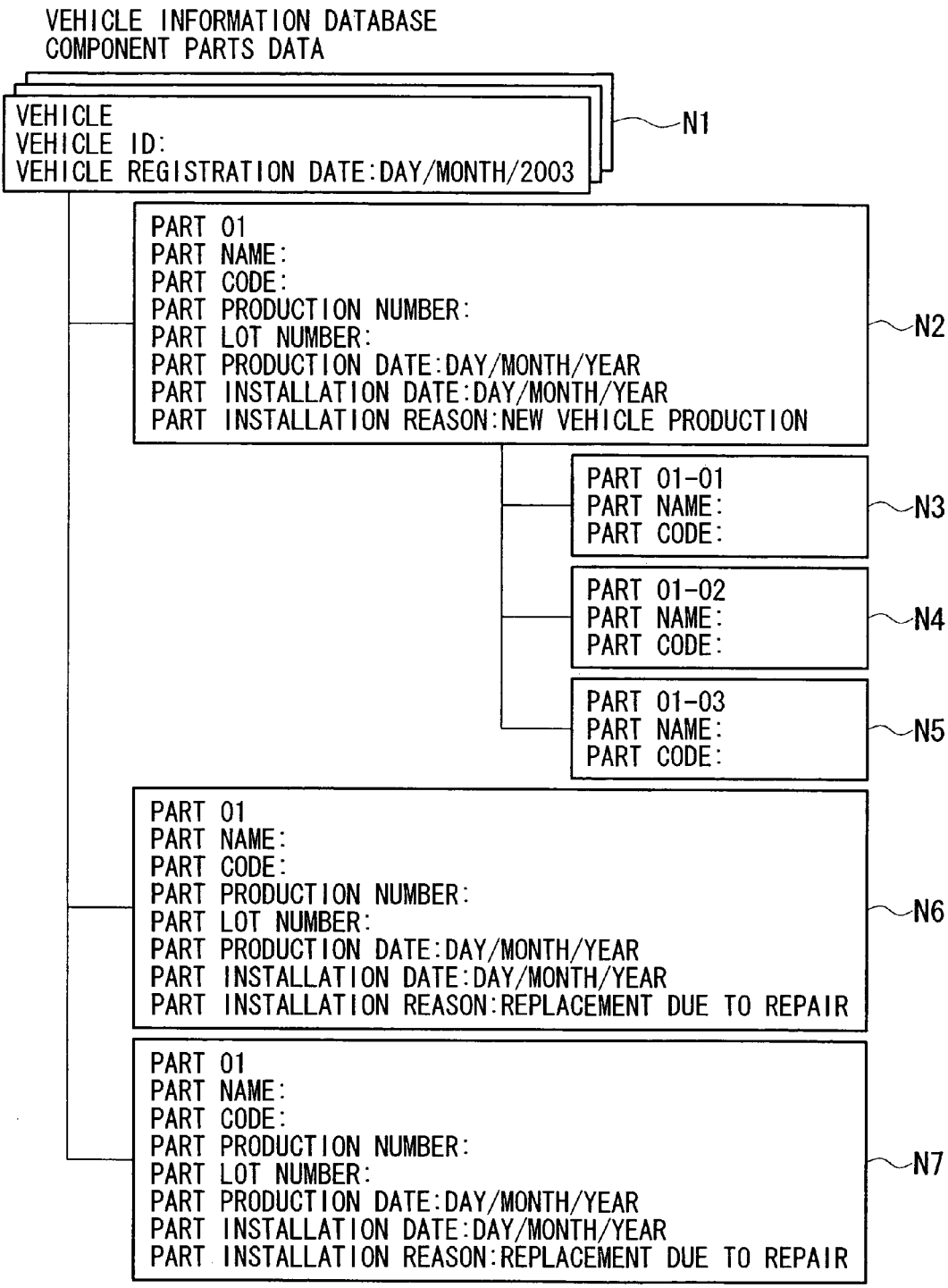
FIG. 13 is a data structure diagram for component parts data for the vehicle management system of the fourth embodiment.

FIG. 13 is a schematic diagram showing a data structure of component parts data included in the vehicle information database 202. As shown in the example, the component parts data holds information on component parts for each vehicle (for each vehicle ID) as data of a tree structure. The reference symbols N1 to N7 denote nodes in the tree structure. The node N1 corresponds to a vehicle and includes data items such as a vehicle ID and a vehicle registration date. The vehicle has parts 01, 02, 03, etc., and information on these parts are stored in the nodes N2, N6 and N7, respectively. The component parts are hierarchical. For example, the part 01 has parts 01-01, 01-02, 01-03, etc., and information on these parts is stored in the nodes N3, N4 and N5. Each of the nodes N2 to N7 includes data items such as a part name indicating the name of a part, a part code for identifying the type of a part, a part production number allocated to each part individual, a part lot number indicating a lot at part production, a part production date indicating a date when a part is produced, a part installation date indicating a date when a part is installed on a vehicle or a date when it is installed on a higher level part, and a part installation reason indicating the reason why a part is installed (event, for example, "new vehicle production" or "replacement due to repair").

FIG. 13 illustrates a case in which the number of part hierarchies is two; however, any number of hierarchies may be used.

FIG. 14 is a schematic diagram showing a data structure of vehicle history data included in the vehicle information database 202. As shown in the example, the vehicle history data holds history information for each vehicle (for each vehicle ID) and includes at least data items of date, history outline and details. The values of the items of the history outline are "new vehicle production", "owner registration", "owner change" "refueling" "repair", "registration cancel" and "waste management tag issuance". These pieces of history information occur in the terminals 220 each time each event occurs. The information is written into an IC tag provided on a vehicle or an IC tag of a vehicle registration certificate as necessary and is transmitted from the terminals 220 to the control part 201. The control part 201 performs writing into the database based on the transmitted information.

When the history outline is "new vehicle production", the name of a production company and the name of a factory are written as detailed data. When the history outline is "owner registration", the name and address of an owner are written as detailed data. When the history outline is "refueling", information specifying a gas station, the amount of refueling and odometer information at refueling are written as detailed data. When the history outline is "repair", information on the name of a repair factory and the contents of repair is written as detailed data. When the history outline is "owner change", the name and address of a new owner are written as detailed data.

FIG. 15 shows an outline of waste management tag issuance data included in the vehicle information database 202. As shown in the example, the waste management tag issuance data includes, for each vehicle (for each vehicle ID), data items such as a waste management tag issued flag, a waste disposal code, discarding company information, collection and transportation company information, intermediate processing company information, final disposal company information, a public key of the discarding company, a public key of the collection and transportation company, a public key of the intermediate processing company, and a public key of the final disposal company. The waste management tag issued flag is information indicating whether a waste management tag (manifest) has already been issued or not. The waste disposal code is information indicating whether the waste management tag is issued in a sheet form or in an electronic form. A secret key corresponding to each of the public keys is held by a computer of each company. A company at each stage (for example, the intermediate processing company) may be a plurality of companies according to the contents of processing. In this case, public key information for each company is held in the waste management tag issuance data.

Figure 16:
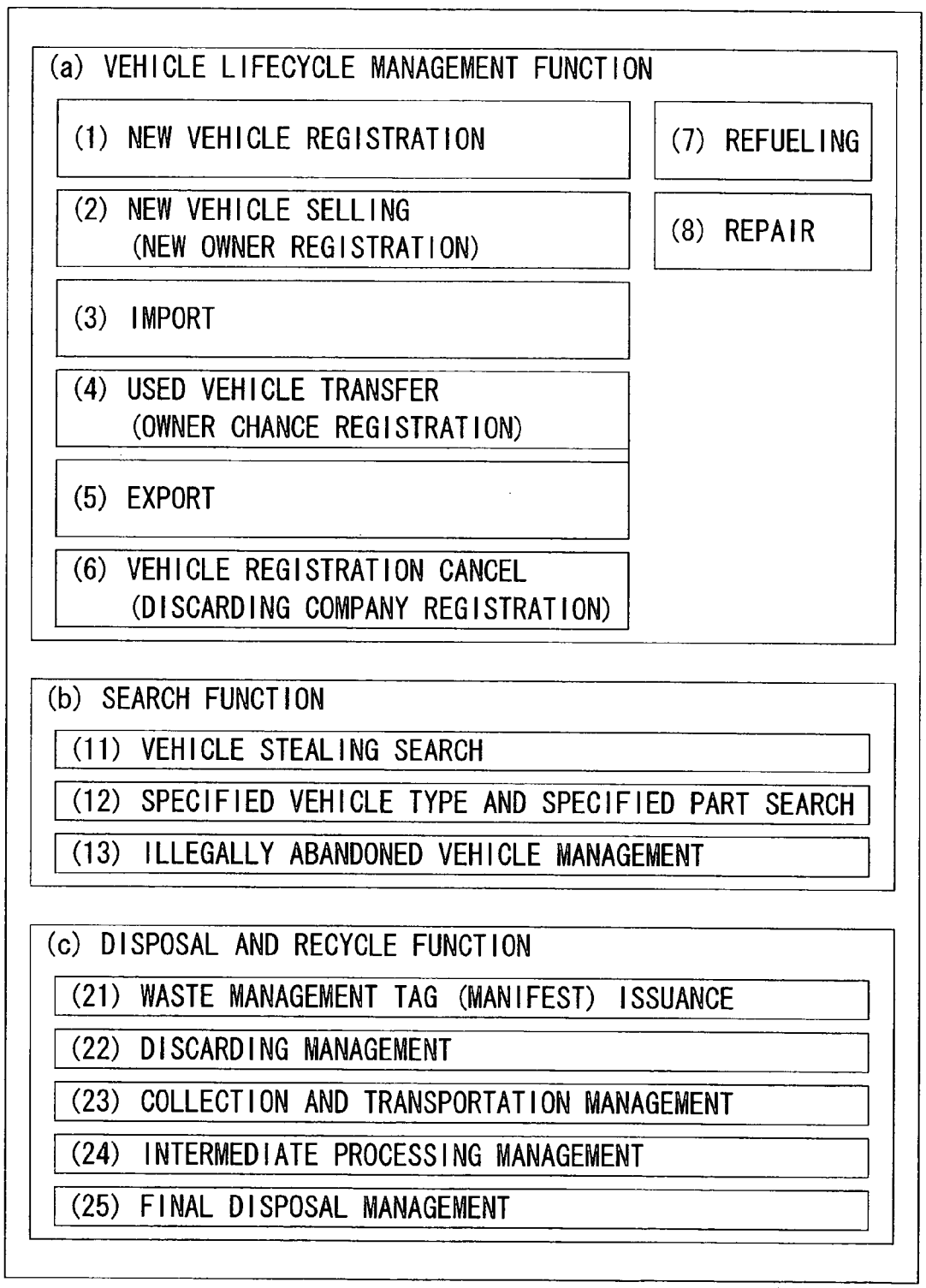
FIG. 16 is a function list diagram of a control part of a vehicle information management server for the vehicle management system of the fourth embodiment.

FIG. 16 is a schematic diagram showing the list of functions of the control part 201 of the vehicle information management server 210. As shown in the drawing, in this embodiment, the control part 201 is broadly divided into a vehicle life cycle management function (a), a search function (b), and a disposal and recycle function (c).

In detail, the vehicle life cycle management function includes functions of (1) new vehicle registration, (2) new vehicle selling (new owner registration), (3) import, (4) used vehicle transfer (owner change registration), (5) export, (6) vehicle registration information cancel (discarding company registration), (7) refueling, and (8) repair. The search function includes functions of (11) vehicle theft search, (12) specified vehicle type and specified part search, and (13) illegally abandoned vehicle management. The disposal and recycle function includes functions of (21) waste management tag (manifest) issuance, (22) discharge management, (23) collection and transportation management, (24) intermediate processing management, and (25) final disposal management. The functions will be described below.

(1) The new vehicle registration function receives a vehicle ID and component parts data of a new vehicle from the terminal 220 of a vehicle production factory to register data of the new vehicle into the vehicle information database 202. At this time, information written into an IC tag provided on the vehicle and an IC tag embedded in the vehicle registration certificate is generated at the same time.

(2) The new vehicle selling (new owner registration) function receives data of the name and address of the owner from the terminal 220 of a dealer and the vehicle selling web site server 230 to register owner data of the vehicle information database 202.

(3) The import function performs the same processing as the later-described used vehicle transfer in the case of import from a country (area) managed by the vehicle management system. In the case of import from other counties (areas), owner data and component parts data of a new vehicle are registered and the past history information is registered as vehicle history data. The function necessary for the processing of the import function is received from the terminal 220 of customs.

(4) The used vehicle transfer (owner change registration) function receives data of the name and address of an owner after transfer from the terminal 220 of a used vehicle dealer to register new owner data into the vehicle information database 202, thereby adding vehicle history data.

(5) The export function performs the same processing as the above-described used vehicle transfer in the case of export to a country (area) managed by the vehicle management system. In the case of export to other countries (areas), the owner data is updated or cancelled to add the export record as vehicle history data. The function necessary for the processing of the export function is received from the terminal 220 of customs.

(6) The vehicle registration information cancel (discarding company registration) function adds information indicating registration cancel as vehicle history data and registers a discarding company as a first company required to perform waste disposal into the vehicle information database 202.

(7) The refueling function receives data about refueling (information on the amount of refueling, odometer information and refueling place information) from the terminal 220 of a gas station to register it as vehicle history data.

(8) The repair function receives data about repair from the terminal 220 of a repair factory to register it as vehicle history data. When performing part replacement at repair, the component parts data of the vehicle information database is updated.

(11) The vehicle theft search function performs theft search by the vehicle ID of a stolen vehicle. The theft search information is transmitted to the terminals 220 of customs, a repair factory and a gas station. For example, at a gas station, a vehicle ID is read from an IC tag provided on a vehicle in the vehicle stop position for refueling to compare the vehicle ID read from the IC tag of the vehicle with the vehicle ID of the theft search information. After the comparison, when both are matched with each other, refueling may be automatically stopped to notify information on the place of the gas station to the vehicle information management server side. These can determine the location of the stolen vehicle relatively easily.

(12) The specified vehicle type and specified part search function specifies a vehicle having a part of a specified lot which is approaching the end of its life by searching the component parts data in the vehicle information database 202 to obtain owner data of the vehicle. This can send a notice of part replacement to the owner. Part of the vehicle history data includes a vehicle inspection history, a replacement history of a part such as a tire, and a maintenance or inspection history to send a notice of the next vehicle inspection, part replacement and inspection based on the vehicle history data when a predetermined period elapses from the previous vehicle inspection, part replacement and inspection. These notices may be mailed to the address of the owner or may be sent as E-mail to an E-mail address held as owner data. Other than the case of the life of the part, in a part incorporating control means of software, a notice for function addition of the software may be sent to the owner.

(13) The illegally abandoned vehicle management function outputs information on an illegally abandoned vehicle. For example, when an illegally abandoned vehicle is found, a portable terminal device is used at the abandonment site to read a vehicle ID from an IC tag provided-on the vehicle. Based on the vehicle ID, the control part 201 reads the vehicle history data and owner data of the corresponding vehicle from the vehicle information database 202. When the vehicle has already had its registration cancelled and has been transferred to disposal, the state of the waste disposal is traced based on data written into the vehicle information database 202 from the disposal and recycle function, which will be explained below.

Figure 17:
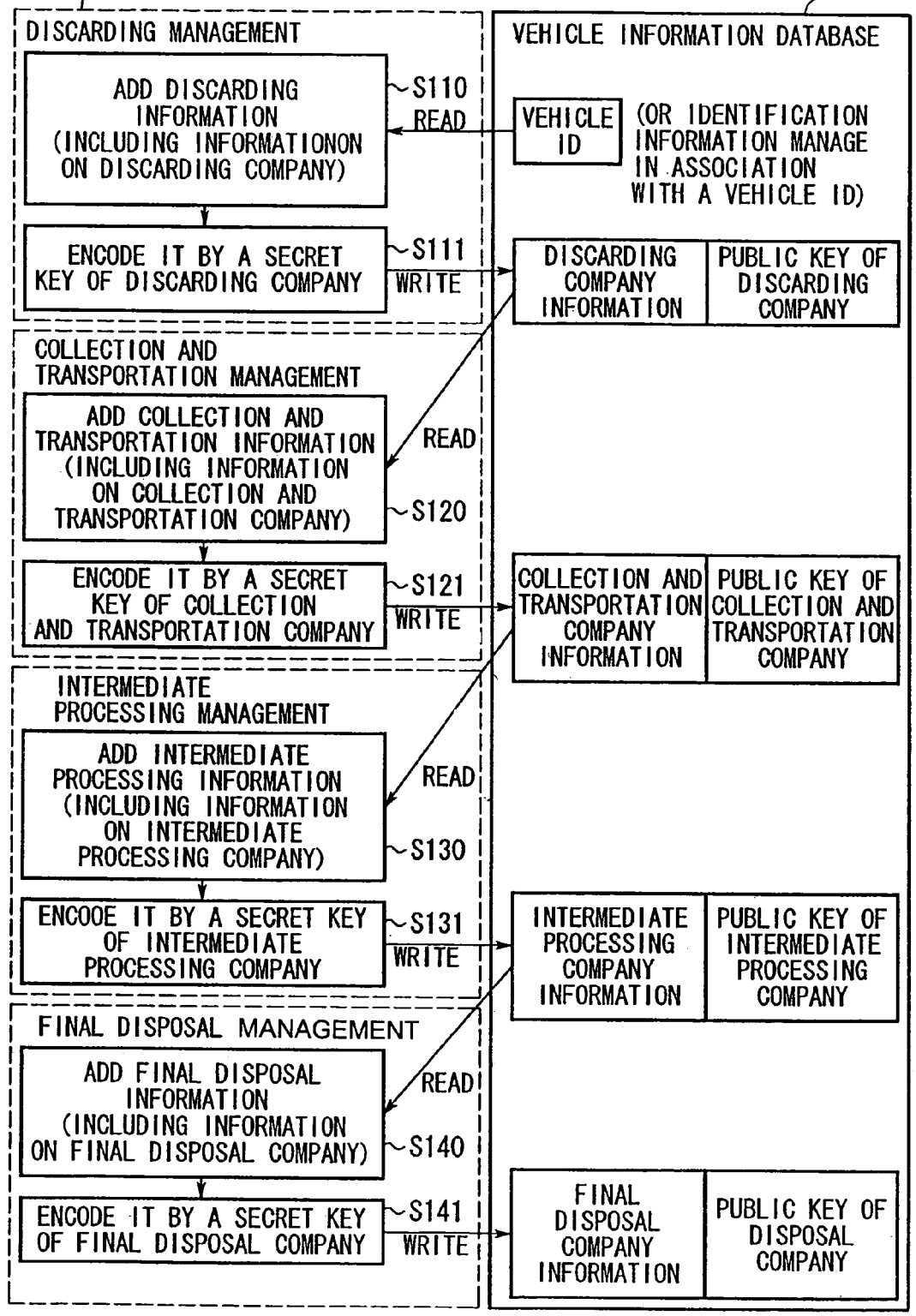
FIG. 17 is a flowchart of data processing in a disposal and recycle function for the vehicle management system of the fourth embodiment.

The disposal and recycle function will be described. FIG. 17 is a schematic diagram showing processing and data flow in the disposal and recycle function. In FIG. 17, discarding management, collection and transportation management, intermediate processing management, and final disposal management are functions owned by the control part 201. The processing shown in the drawing assumes that an electronic waste management tag has already been issued. When performing the processing of vehicle registration information cancel, the processing of waste management tag issuance is performed in engagement with it to write the waste management tag (waste management tag data) as electronic data into the vehicle information database 202. A vehicle ID is included in the waste management tag data to associate the waste management tag data with other data in the vehicle information database by the vehicle ID. Instead of holding the waste management tag data in the vehicle information database 202, it may be written and held into another storage area in the vehicle information management server 210 or a recording medium (not shown) such as a magnetic disc in another computer.

The disposal and recycle function will be described below according to the flow of FIG. 17. The discarding management function owned by the control part 201 reads a vehicle ID of a vehicle to be disposed of from the vehicle information database 202 to add discarding information (including information on a discarding company) (step S110). Information including the vehicle ID and discarding information is transmitted to the terminal 220 of the discarding company via the communication network 280 to ask for encoding. The discarding company side encodes the information by a secret key of the discarding company to return it to the discharge management function of the control part 201. The discarding management function writes the returned encoded information as discarding company information into the vehicle information database 202 to write a public key of the discarding company into the vehicle information database 202 (step S111).

The collection and transportation management function owned by the control part 201 reads the discarding company information from the vehicle information database 202 to add collection and transportation information (including information on a collection and transportation company) (step S120). The added information is transmitted to the terminal 220 of the collection and transportation company via the communication network 280 to ask for encoding. The collection and transportation company side encodes the information by a secret key of the collection and transportation company to return it to the collection and transportation management function of the control part 201. The collection and transportation management function writes the returned encoded information as collection and transportation company information into the vehicle information database 202 to write a public key of the collection and transportation company into the vehicle information database 202 (step S121).

The intermediate processing management function owned by the control part 201 reads the collection and transportation company information from the vehicle information database 202 to add intermediate processing information (including information on an intermediate processing company) (step S130). The added information is transmitted to the terminal 220 of the intermediate processing company via the communication network 280 to ask for encoding. The intermediate processing company side encodes the information by a secret key of the intermediate processing company to return it to the intermediate processing management function of the control part 201. The intermediate processing management function writes the returned encoded information as intermediate processing company information into the vehicle information database 202 to write a public key of the intermediate processing company into the vehicle information database 202 (step S131).

The final disposal management function owned by the control part 201 reads the intermediate processing company information from the vehicle information database 202 to add final disposal information (including information on a final disposal company) (step S140). The added information is transmitted to the terminal 220 of the final disposal company via the communication network 280 to ask for encoding. The final disposal company side encodes the information by a secret key of the final disposal company to return it to the final disposal management function of the control part 201. The final disposal management function writes the returned encoded information as final disposal company information into the vehicle information database 202 to write a public key of the final disposal company into the vehicle information database 202 (step S141).

As described above, the processing from steps S110 to S141 is performed according to each stage of waste disposal to manage waste information, thereby managing information on the state of disposal in a unified way. The information is encoded by the secret key of each company. It is decoded using the corresponding public key to reliably ensure that it is information added by the company to hold information enough for exactly tracing the process of the waste disposal in the vehicle information database. The information on the waste disposal is associated with a vehicle ID of the vehicle. The vehicle ID corresponds to a vehicle ID written into an IC tag provided in a vehicle registration certificate or on a vehicle itself. The vehicle individual to be disposed of as waste can be reliably identified.

The example of FIG. 17 assumes the processing of the discarding company, the collection and transportation company, the intermediate processing company and the final disposal company in that order. Another order is also possible. The information on the disposal and recycle company may be encoded and added stepwise. For example, a single company may perform both collection and transportation and intermediate processing together, the intermediate processing may be divided into a plurality of stages by a plurality of companies, or the disposal company may be divided according to a material constituting a waste.

The vehicle information management server 210, the terminals 220, the portable terminal 221, and the vehicle selling web site server 230 have therein a computer system. The process of each processing of the vehicle information management is stored in a computer-readable recording medium in a program form. The program is read and executed by a computer to perform the above processing. The computer-readable recording medium refers to a magnetic disc, an optical magnetic disc, a CD-ROM, a DVD-ROM, and a semiconductor memory. The computer program is delivered via a communication line to a computer. The computer which has received the delivery may execute the program.

The embodiments of this invention are described above in detail with reference to the drawings. A specific configuration is not limited to these embodiments and includes design in a scope without departing from the purpose of this invention.

Fifth Embodiment

A fifth embodiment of the present invention will be explained below with reference to the appended drawings. The front, rear, left, and right directions described below are the same as the direction of a vehicle.

Figure 18:
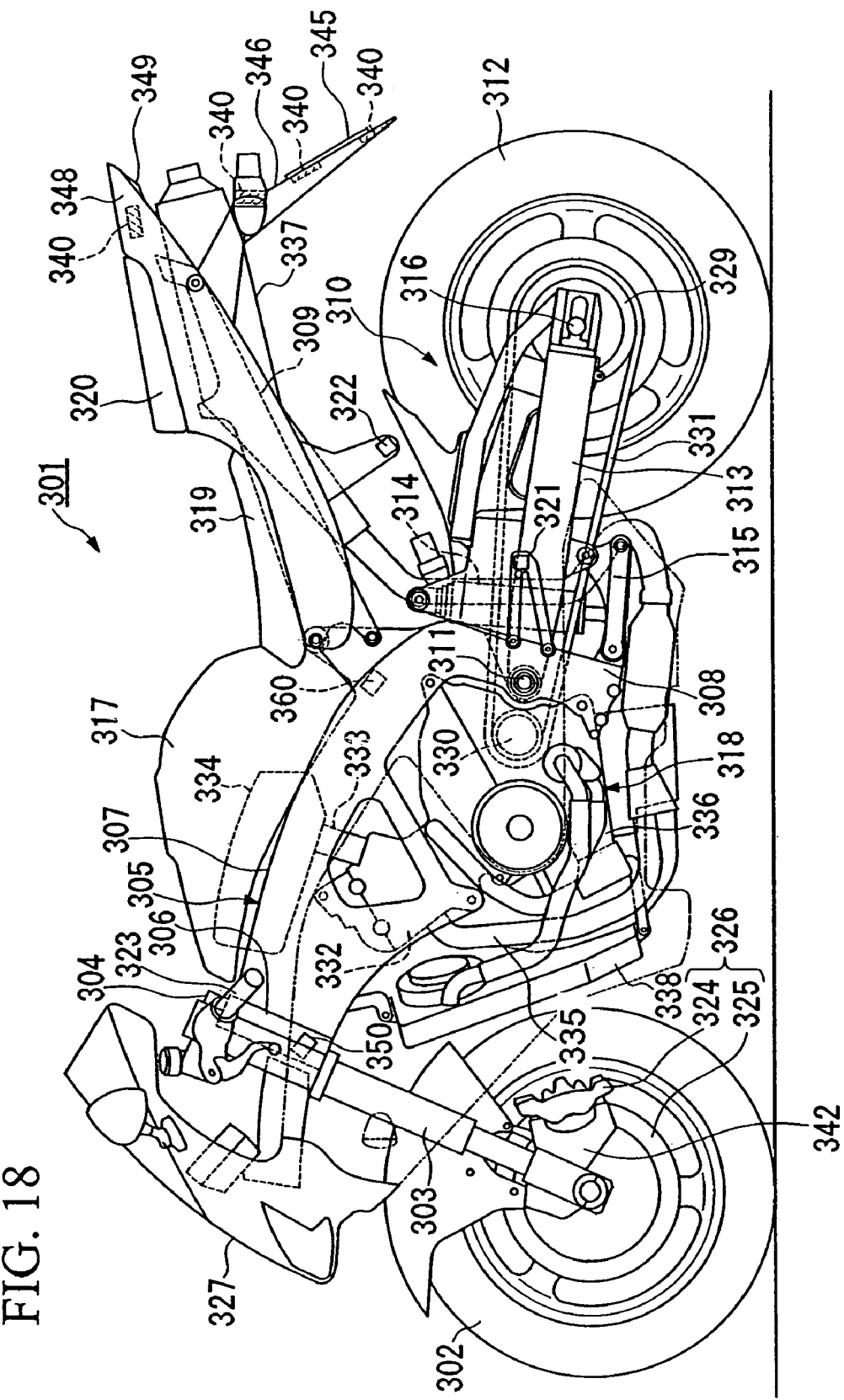
FIG. 18 is a side view of a motorcycle viewed from the left side as a fifth embodiment of the present invention.

FIG. 18 shows a motorcycle 301 with the tag of the present invention formed by metal parts. As shown in FIG. 18, a front fork 303 axially supporting a front wheel 302 of the motorcycle 301 is steerably pivoted on a head pipe 306 provided at the front end of a body frame 305 via a steering stem 304. A main frame 307 of the body frame 305 extends so as to be inclined from the head pipe 306 downward and rearward. Its rear end is bent downward to be continuous to a pivot plate 308. The rear part of the main frame 307 is connected to the front end of a seat frame 309 and extends so as to be inclined upward and rearward.

The base end part of a swing arm 313 is swingably installed on the pivot plate 308 via a pivot axis 311. A rear wheel 312 is axially supported at the edge of the swing arm 313. The upper end of a shock absorber unit 314 is installed on the upper part of the base end side of the swing arm 313. The lower end of the shock absorber unit 314 is coupled to the pivot plate 308 below the pivot axis 311 via a link mechanism 315.

A fuel tank 317 is mounted above the main frame 307 and a water-cooled type series four-cylinder type engine 318 is mounted below the main frame 307. The fuel tank 317 is provided at the rear side with a driver's seat 319 and a rear passenger's pillion seat 320. A driver's step 321 is installed on the rear part of the pivot plate 308. A rear passenger's step 322 is installed on the lower part of the seat frame 309.

A steering handle 323 is installed on the upper end of the front fork 303. A brake caliper 324 is installed on the lower end of the front fork 303 via a caliper bracket 342. A brake disk 325 corresponding to the brake caliper 324 is installed on the hub part of the front wheel 302 to form a front disk brake (disk brake) 326 according to this invention. The rear wheel 312 is provided in its right side with a rear disk brake having the same construction as the front disk brake 326.

The body front part of the motorcycle 301 is covered by a front cowl 327 and the peripheral part of the seat frame 309 is covered by a rear cowl 348. A rear sprocket 329 is installed on the left side of the rear wheel 312. A drive chain 331 is trained over the rear sprocket 329 and a drive sprocket 330 disposed on the left side of the rear part of the engine 318 to transmit the driving force of the engine 318 to the rear wheel 312.

The rear part of a cylinder 332 of the engine 318 is connected to a throttle body 333 corresponding to each cylinder. Each throttle body 333 is connected to an air cleaner case 334 arranged between the main frame 307 and the fuel tank 317. The front part of the cylinder 332 is connected to an exhaust pipe 335 corresponding to each cylinder. The exhaust pipe 335 is curved downward from the front wall part of the cylinder 332 to pass below a crank case 336, thereby being bent upward in the rear part of the pivot plate 308 to be connected to a muffler 337 supported on the seat frame 309. A radiator 338 for cooling the engine 318, is disposed in the front part of the exhaust pipe 335.

Figure 19:
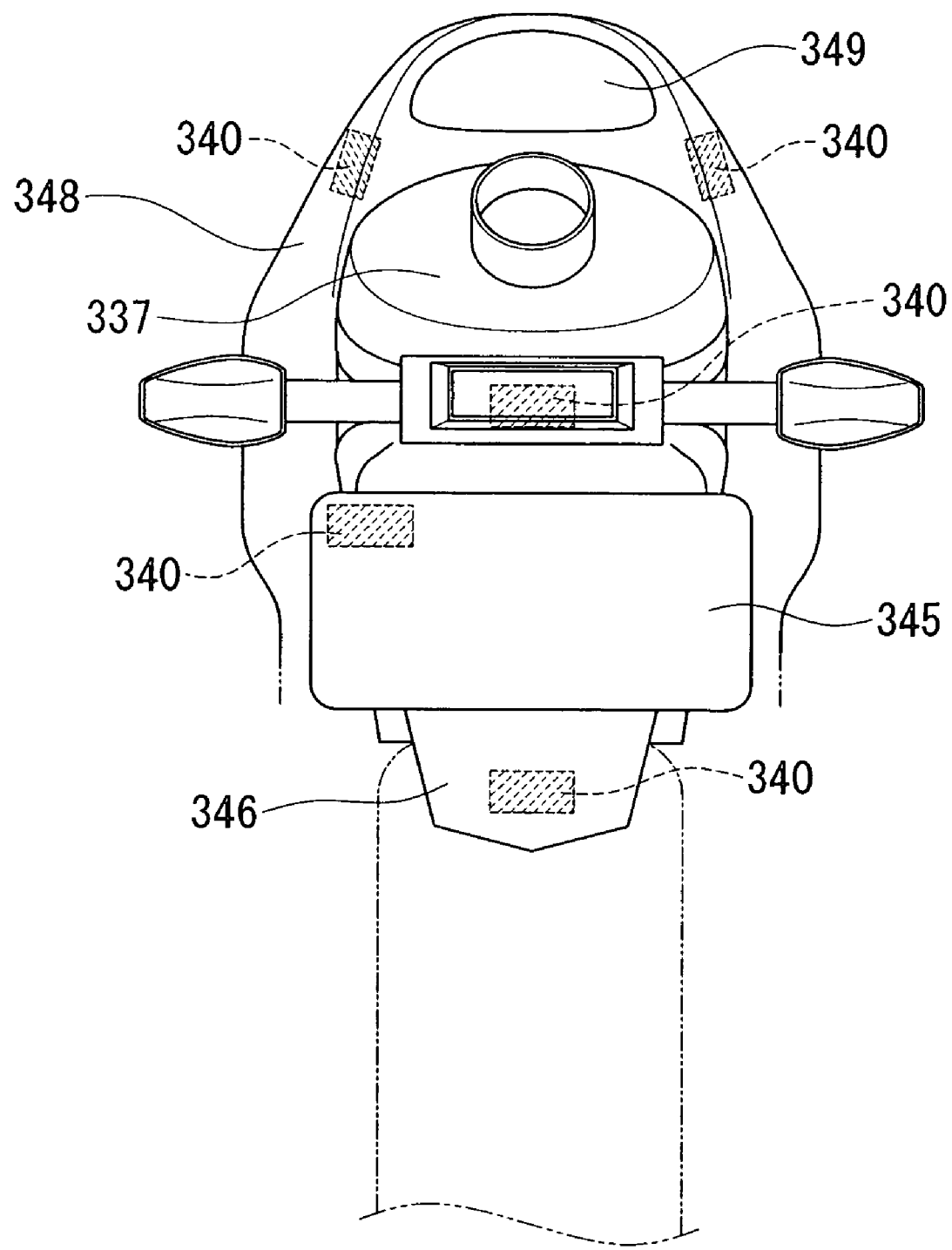
FIG. 19 is a rear view of the rear end portion of the motorcycle.

FIG. 19 is a diagram showing the vehicle body shown in FIG. 18, viewed from the back side. The muffler 337, which is a center-up type muffler, is arranged just below a tail lamp 349. A rear fender 346 and a license plate 345 are arranged below the muffler 337. An IC tag 340 is arranged on the license plate 345 and its peripheral part and is arranged in a position which avoids a failure of reading and writing between a radio frequency (RF, radio) and the IC tag 340. The IC tag 340 is arranged in such position to easily supply a transmission/reception signal from the reader spaced from the motorcycle 301 to the IC tag 340. Even when the IC tag 340 is arranged on the rear cowl 348 or the rear fender 346, as long as it is arranged near the license plate 345, the same effects of the invention can be obtained.

In the above embodiment, a specific product example and a specific data structure of product information are not particularly limited. As the specific product example, there can be considered, as a transportation apparatus, a vehicle other than the motorcycle 1 (automobile, bus, truck, motorcycle, motorbike, bicycle, and four-wheel buggy), airplane, ship, boat, yacht or marine bike.

At least any one of product registration information (vehicle registration information, and information on the name, address, and E-mail address of an owner) and history information (history information on production, registration, owner transfer, refueling, maintenance, inspection, repair, part replacement, import and export, and registration cancellation) is associated with product identification information to write it into a database of an external computer system or a memory in an IC tag, thereby outputting registration information or history information about the product individual based on the identification information. The outputted information can be checked by a human.

According to the present invention, the following effects can be achieved.

(1) Because an IC tag is housed in a case formed of a material having transmissivity to electromagnetic waves, the IC tag can be protected from wind, rain and dust without interrupting its transmitted/received electromagnetic wave.

(2) Because an IC tag is housed in a meter unit having a high sealing ability, another case having a high sealing ability need not be prepared.

(3) Because an IC tag is installed on the back surface of a meter panel formed of a material having transmissivity to electromagnetic waves, the IC tag can be protected from ultraviolet light and heat without interrupting its transmitted/received electromagnetic waves.

(4) Because only a vehicle ID is registered into an IC tag of each vehicle and other tag information can be managed together by a host server and its database connected to a network for searching by the vehicle ID, the storage capacity of an IC tag equipped in each vehicle can be small.

(5) Because an IC tag is installed near a steering handle of a saddle-ride type vehicle, when a reader is directed from the front side of a plurality of saddle-ride type vehicles placed parallel to each other for transportation and storage, transmitted/received electromagnetic waves outputted by the IC tag reaches the reader without being shielded. In addition, because reading is simplified and an electromagnetic wave output of the IC tag and the reader can be reduced, the cost can be reduced by the smaller IC tag and an electromagnetic wave output of the reader.

(6) Because an IC tag is installed near a license plate at the rear side of the body of a saddle-ride type vehicle. When a tag reader is directed from the rear side of a plurality of saddle-ride type vehicles placed parallel to each other for transportation and storage, transmitted/received electromagnetic waves outputted by the IC tag reaches the reader without being blocked. In addition, because data reading is simplified and electromagnetic waves output of the IC tag and the reader can be reduced, the cost can be reduced by the smaller IC tag and an electromagnetic wave output of the reader.

(7) An IC tag receives a read/write signal transmitted from an IC tag reader to perform writing into a memory in the IC tag and reading of predetermined vehicle information written into the memory, and the read vehicle information is transmitted on electromagnetic waves.

Therefore, reading and writing of vehicle information can be realized using radio. In particular, it is possible to facilitate installation on the lower part of the body of a motorcycle or a four-wheel vehicle and reading and writing of vehicle information.

The invention claimed is:

1. An integrated circuit (IC) tag equipped motorcycle comprising:
    an element formed of a resin material having transmissivity to electromagnetic waves;
    a saddle-ride seat and a steering handle, wherein the element is disposed near said steering handle; and
    an IC tag integrated with the element by insert forming, including an ID code specific to the motorcycle is registered therein in standardized data form,
    the IC tag comprising:
        a CPU;
        an antenna configured to transmit and receive electromagnetic waves in a radio frequency band;
        a radio frequency controller connected to and configured to control the antenna;
        a modem; and
        a memory portion;
        wherein the modem is configured to detect an electromagnetic wave received by the antenna and to modulate information stored in the memory portion to transmit the information from the antenna, and
        wherein the memory portion comprises a rewritable area and a rewrite-protect area, the rewrite-protect area configured to store the ID code and to protect against rewriting using a read-only memory (ROM);
    wherein the element comprises a case for a meter unit having high sealing ability, and the meter unit comprising a meter panel on which a speedometer is arranged; said case of the meter unit is configured to protect said IC tag from wind, rain and dust without interrupting electromagnetic waves transmitted/received by said IC tag;
    wherein the IC tag is housed within the meter unit on a surface of the meter panel;
    wherein the meter panel is formed of a material having transmissivity to electromagnetic waves, and the IC tag is installed on a back surface of the meter panel; said back surface of the meter panel is configured to protect said IC tag from ultraviolet light and heat without interrupting electromagnetic waves transmitted/received by said IC tag;
    wherein the rewritable area of the memory portion of the IC tag includes information on the owner of the motorcycle;
    wherein the motorcycle comprises the said speedometer, a fuel gauge, an odometer, left and right turn indicators, and an ignition indicator, all arranged in the meter panel; and
    wherein said motorcycle is configured and arranged such that when a current mileage reading is registered at maintenance or repair of the motorcycle, a presence or absence of an odometer reset due to rolling back of the odometer can be checked for.

2. The IC tag equipped motorcycle according to claim 1, wherein the IC tag is molded in resin.

3. The IC tag equipped motorcycle according to claim 1, wherein the IC tag is embedded in a resin of a resin case.

4. The IC tag equipped motorcycle according to claim 1, wherein the rewritable area of the memory portion of the IC tag includes recycling information.

5. The IC tag equipped motorcycle according to claim 1, wherein the rewritable area of the memory portion of the IC tag includes information which must be described in accordance with a manifest system.

6. The IC tag equipped motorcycle according to claim 1, wherein the rewritable are of the memory portion of the IC tag includes identification information on component parts of the motorcycle.

7. The IC tag equipped motorcycle according to claim 1, wherein the rewritable area of the memory portion of the IC tag includes a replacement record of consumable parts of the motorcycle.

8. The IC tag equipped motorcycle according to claim 1, wherein the rewritable area of the memory portion of the IC tag includes a maintenance record of the motorcycle.

9. The IC tag equipped motorcycle according to claim 1, wherein the rewritable area of the memory portion of the IC tag includes an insurance contract record of the motorcycle.

10. The IC tag equipped motorcycle according to claim 1, wherein the rewritable area of the memory portion of the IC tag includes a tax payment record of the motorcycle.

11. The IC tag equipped motorcycle according to claim 1, wherein the rewritable area of the memory portion of the IC tag includes information recorded into a motorcycle inspection certificate of the motorcycle.

12. The IC tag equipped motorcycle according to claim 1, wherein said IC tag is configured such that said IC tag is operatively associated with a management system, said management system comprising a host server and a terminal, the host server and the terminal communicating with each other via a network; and a database connected to the host server, and being operable to manage tag information on said IC tag;

wherein the terminal comprises:

a device for updating received tag information; and a device for transmitting updated tag information to the host server, and the host server comprises:

a device for receiving the updated tag information; and a device for updating the database based on the updated tag information.

* * * * *